(12) United States Patent
Chung

(10) Patent No.: US 9,237,301 B2
(45) Date of Patent: Jan. 12, 2016

(54) INTEGRATED AUDIO VIDEO SIGNAL PROCESSING SYSTEM USING CENTRALIZED PROCESSING OF SIGNALS

(75) Inventor: Chul Chung, Pleasanton, CA (US)

(73) Assignee: Mondo Systems, Inc., Seoul (KR)

( * ) Notice: Subject to any disclaimer, the term of this patent is extended or adjusted under 35 U.S.C. 154(b) by 2498 days.

(21) Appl. No.: 11/425,923

(22) Filed: Jun. 22, 2006

(65) Prior Publication Data
US 2006/0245600 A1    Nov. 2, 2006

Related U.S. Application Data

(62) Division of application No. 11/145,010, filed on Jun. 6, 2005.

(60) Provisional application No. 60/640,085, filed on Dec. 30, 2004.

(51) Int. Cl.
*G06F 17/00* (2006.01)
*H04N 5/775* (2006.01)
*H04L 12/28* (2006.01)
(Continued)

(52) U.S. Cl.
CPC ............ *H04N 5/775* (2013.01); *H04L 12/2803* (2013.01); *H04L 12/2838* (2013.01); *H04N 21/40* (2013.01); *H04L 2012/2849* (2013.01);
(Continued)

(58) Field of Classification Search
USPC .......................................................... 700/94
See application file for complete search history.

(56) References Cited

U.S. PATENT DOCUMENTS 3,582,964 A    6/1971    Torick et al.
3,757,906 A    9/1973    Baezold
(Continued)

FOREIGN PATENT DOCUMENTS

JP    2002-84154    3/2002
WO    0015003    3/2000
(Continued)

OTHER PUBLICATIONS

"A New High-Efficiency and Super-Fidelity Analog Audio Amplifier with the aid of Digital Switching Amplifier: Class K Amplifier" Nam-Sung Jung et. al., Copyright 1998.*
(Continued)

*Primary Examiner* — Andrew C Flanders
(74) *Attorney, Agent, or Firm* — H.C. Park & Associates, PLC

(57) ABSTRACT

Integrated processing of audio/video signals can eliminate unnecessary signal processors and converters without losing the functionality of typical home entertainment system components. The integrated system includes a main player that captures and processes signals digitally, a dummy display, and a dummy speaker. The dummy display may only have a display panel and a panel driver. The dummy speaker may only have a driving unit and no crossover logic. The main player may have a PC architecture and process all signals digitally for outputting signals tailored for the display device and the individual driving units of the dummy speaker. The integrated system may also provide dynamic signal adjustments based on the surrounding environment. The main player may include a storage device and can process media content stored therein to produce supplemental information to provide an optimal audiovisual experience. This supplemental information can be shared among users over a network connection.

3 Claims, 13 Drawing Sheets

(51) Int. Cl.
*H04N 21/40* (2011.01)
*H04N 5/781* (2006.01)
*H04N 5/85* (2006.01)
*H04N 9/804* (2006.01)

(52) U.S. Cl.
CPC *H04N 5/781* (2013.01); *H04N 5/85* (2013.01); *H04N 9/8042* (2013.01)

(56) References Cited

U.S. PATENT DOCUMENTS

| | | | |
|---|---|---|---|
| 4,204,092 A | 5/1980 | Bruney | |
| 4,251,688 A | 2/1981 | Furner | |
| 4,306,113 A | 12/1981 | Morton | |
| 4,387,270 A | 6/1983 | Sakano et al. | |
| 4,398,280 A | 8/1983 | Ishigami et al. | |
| 4,406,923 A | 9/1983 | Burne, III et al. | |
| 4,468,710 A | 8/1984 | Hashimoto et al. | |
| 4,502,149 A * | 2/1985 | Gefvert | 381/182 |
| 4,503,553 A | 3/1985 | Davis | |
| 4,675,835 A | 6/1987 | Pfleiderer | |
| 4,747,132 A | 5/1988 | Ibaraki et al. | |
| 4,800,446 A | 1/1989 | Kanamaru | |
| 4,905,284 A | 2/1990 | Kwang | |
| 4,991,023 A | 2/1991 | Nicols | |
| 5,000,286 A * | 3/1991 | Crawford et al. | 181/145 |
| 5,018,205 A | 5/1991 | Takagi et al. | |
| 5,043,970 A | 8/1991 | Holman | |
| 5,191,421 A | 3/1993 | Hwang | |
| 5,222,059 A | 6/1993 | Holman | |
| 5,255,326 A | 10/1993 | Stevenson | |
| 5,265,083 A | 11/1993 | Ishii et al. | |
| 5,341,166 A | 8/1994 | Garr et al. | |
| 5,406,634 A | 4/1995 | Anderson et al. | |
| 5,446,505 A | 8/1995 | Chang Soo | |
| 5,583,561 A | 12/1996 | Baker et al. | |
| 5,615,270 A | 3/1997 | Miller et al. | |
| 5,671,018 A | 9/1997 | Ohara et al. | |
| 5,675,390 A | 10/1997 | Schindler et al. | |
| 5,708,961 A | 1/1998 | Hylton et al. | |
| 5,742,688 A | 4/1998 | Ogawa et al. | |
| 5,751,504 A | 5/1998 | Tanaka | |
| 5,805,173 A | 9/1998 | Glennon et al. | |
| 5,814,752 A | 9/1998 | Rivera | |
| 5,838,823 A | 11/1998 | Ancessi | |
| 5,850,352 A | 12/1998 | Moezzi et al. | |
| 5,907,622 A | 5/1999 | Dougherty | |
| 5,909,496 A | 6/1999 | Kishigami et al. | |
| 5,932,883 A | 8/1999 | Hashimoto et al. | |
| 5,945,988 A | 8/1999 | Williams et al. | |
| 6,037,981 A | 3/2000 | Wilson et al. | |
| 6,073,033 A | 6/2000 | Campo | |
| 6,141,490 A | 10/2000 | Oishi et al. | |
| 6,147,713 A | 11/2000 | Robbins et al. | |
| 6,169,879 B1 | 1/2001 | Perlman | |
| 6,201,580 B1 | 3/2001 | Voltz | |
| 6,201,873 B1 | 3/2001 | Dal Farra | |
| 6,236,731 B1 | 5/2001 | Brennan et al. | |
| 6,236,805 B1 | 5/2001 | Sebestyen | |
| 6,263,502 B1 | 7/2001 | Morrison et al. | |
| 6,295,090 B1 | 9/2001 | Voltz | |
| 6,337,716 B1 | 1/2002 | Yim | |
| 6,342,925 B1 | 1/2002 | Akhavan | |
| 6,370,198 B1 | 4/2002 | Washino | |
| 6,385,322 B1 | 5/2002 | Mietling | |
| 6,396,933 B1 | 5/2002 | Jung et al. | |
| 6,405,227 B1 | 6/2002 | Prakash | |
| 6,442,277 B1 | 8/2002 | Lueck et al. | |
| 6,449,767 B1 | 9/2002 | Krapf et al. | |
| 6,459,799 B1 * | 10/2002 | Smits | 381/191 |
| 6,466,250 B1 * | 10/2002 | Hein et al. | 348/14.16 |
| 6,507,951 B1 | 1/2003 | Wugofski | |
| 6,530,083 B1 | 3/2003 | Liebenow | |
| 6,530,085 B1 | 3/2003 | Perlman | |
| 6,546,298 B1 * | 4/2003 | Bull | 700/94 |
| 6,559,893 B1 | 5/2003 | Martin | |
| 6,574,339 B1 | 6/2003 | Kim et al. | |
| 6,587,403 B1 | 7/2003 | Keller et al. | |
| 6,587,404 B1 | 7/2003 | Keller et al. | |
| 6,621,768 B1 | 9/2003 | Keller et al. | |
| 6,637,028 B1 | 10/2003 | Voyticky et al. | |
| 6,655,212 B2 | 12/2003 | Ohta | |
| 6,678,006 B1 | 1/2004 | Velez et al. | |
| 6,683,655 B2 | 1/2004 | Han | |
| 6,721,428 B1 | 4/2004 | Allred et al. | |
| 6,726,859 B2 | 4/2004 | Suzuki et al. | |
| 6,738,318 B1 | 5/2004 | Harris | |
| 6,741,273 B1 | 5/2004 | Waters et al. | |
| 6,745,223 B1 | 6/2004 | Nobakht et al. | |
| 6,757,906 B1 | 6/2004 | Look et al. | |
| 6,798,654 B2 * | 9/2004 | Chang et al. | 361/679.23 |
| 6,801,708 B1 | 10/2004 | Takahashi et al. | |
| 6,833,879 B1 | 12/2004 | Angel et al. | |
| 6,859,538 B1 | 2/2005 | Voltz | |
| 6,862,460 B2 * | 3/2005 | Safadi | 455/553.1 |
| 6,931,135 B1 | 8/2005 | Kohut | |
| 6,980,189 B2 | 12/2005 | Maruoka et al. | |
| 6,989,835 B2 | 1/2006 | Deering et al. | |
| 6,997,525 B2 * | 2/2006 | Gillengerten | 312/7.2 |
| 6,999,826 B1 | 2/2006 | Zhou et al. | |
| 7,003,124 B1 * | 2/2006 | Thiel | 381/99 |
| 7,006,150 B2 | 2/2006 | Van Der Wijst et al. | |
| 7,023,992 B1 | 4/2006 | Kubota et al. | |
| 7,034,815 B2 | 4/2006 | Neal | |
| 7,046,812 B1 | 5/2006 | Kochanski et al. | |
| 7,058,463 B1 | 6/2006 | Ruha et al. | |
| 7,061,512 B2 | 6/2006 | Morgan et al. | |
| 7,113,609 B1 | 9/2006 | Neidich et al. | |
| 7,201,251 B1 * | 4/2007 | Baird | 181/145 |
| 7,206,025 B2 | 4/2007 | Choi | |
| 7,424,332 B2 | 9/2008 | Okayama | |
| 7,447,815 B2 | 11/2008 | Weaver et al. | |
| 7,489,788 B2 | 2/2009 | Leung et al. | |
| 7,561,935 B2 | 7/2009 | Chung | |
| 7,567,675 B2 | 7/2009 | Bharitkar et al. | |
| 7,653,344 B1 | 1/2010 | Feldman et al. | |
| 7,707,613 B1 | 4/2010 | Wugofski et al. | |
| 7,826,626 B2 | 11/2010 | Bharitkar et al. | |
| 8,090,120 B2 | 1/2012 | Seefeldt | |
| 8,181,216 B2 | 5/2012 | Kondo et al. | |
| 8,194,886 B2 | 6/2012 | Knight et al. | |
| 8,200,349 B2 | 6/2012 | Chung | |
| 8,311,233 B2 | 11/2012 | Kinghorn | |
| 8,331,769 B2 | 12/2012 | Okada et al. | |
| 8,806,548 B2 | 8/2014 | Chung | |
| 8,879,754 B2 | 11/2014 | Par Gunnars | |
| 8,976,974 B2 | 3/2015 | Christoph et al. | |
| 2002/0031120 A1 | 3/2002 | Rakib | |
| 2002/0032905 A1 | 3/2002 | Sherr et al. | |
| 2002/0051539 A1 | 5/2002 | Okimoto et al. | |
| 2002/0067835 A1 | 6/2002 | Vatter | |
| 2002/0072816 A1 * | 6/2002 | Shdema et al. | 700/94 |
| 2002/0080268 A1 | 6/2002 | Willis | |
| 2002/0092026 A1 | 7/2002 | Janniello et al. | |
| 2002/0120925 A1 | 8/2002 | Logan | |
| 2002/0135696 A1 | 9/2002 | Perlman | |
| 2002/0145611 A1 | 10/2002 | Dye et al. | |
| 2002/0159611 A1 | 10/2002 | Cromer et al. | |
| 2002/0164037 A1 | 11/2002 | Sekine | |
| 2002/0167354 A1 | 11/2002 | Stanley | |
| 2002/0173339 A1 * | 11/2002 | Safadi | 455/553 |
| 2002/0174430 A1 | 11/2002 | Ellis et al. | |
| 2002/0184626 A1 | 12/2002 | Darbee et al. | |
| 2002/0186329 A1 | 12/2002 | Tong et al. | |
| 2002/0193896 A1 * | 12/2002 | Bull | 700/94 |
| 2003/0001978 A1 | 1/2003 | Smith et al. | |
| 2003/0018755 A1 | 1/2003 | Masterson et al. | |
| 2003/0031333 A1 | 2/2003 | Cohen et al. | |
| 2003/0037335 A1 | 2/2003 | Gatto et al. | |
| 2003/0090592 A1 | 5/2003 | Callway et al. | |
| 2003/0174845 A1 | 9/2003 | Hagiwara | |
| 2003/0179891 A1 | 9/2003 | Rabinowitz et al. | |
| 2003/0185301 A1 | 10/2003 | Abrams, Jr. et al. | |
| 2003/0198339 A1 | 10/2003 | Roy et al. | |

(56) References Cited

U.S. PATENT DOCUMENTS

| | | | |
|---|---|---|---|
| 2003/0213642 A1* | 11/2003 | Powell | 181/199 |
| 2003/0231261 A1 | 12/2003 | Bassi et al. | |
| 2004/0015992 A1 | 1/2004 | Hasegawa et al. | |
| 2004/0047037 A1 | 3/2004 | Peterson et al. | |
| 2004/0070687 A1 | 4/2004 | Voltz et al. | |
| 2004/0076336 A1 | 4/2004 | Bassi et al. | |
| 2004/0101145 A1 | 5/2004 | Falcon | |
| 2004/0114230 A1 | 6/2004 | Peterson et al. | |
| 2004/0117831 A1 | 6/2004 | Ellis et al. | |
| 2004/0119889 A1 | 6/2004 | Ogata | |
| 2004/0122540 A1 | 6/2004 | Allred | |
| 2004/0123327 A1 | 6/2004 | Fai Ma et al. | |
| 2004/0131338 A1 | 7/2004 | Asada et al. | |
| 2004/0141157 A1 | 7/2004 | Ramachandran et al. | |
| 2004/0193296 A1* | 9/2004 | Melanson | 700/94 |
| 2004/0196279 A1 | 10/2004 | Kim et al. | |
| 2004/0202332 A1 | 10/2004 | Murohashi et al. | |
| 2004/0212881 A1 | 10/2004 | Peterson et al. | |
| 2004/0223622 A1 | 11/2004 | Lindemann et al. | |
| 2004/0223726 A1 | 11/2004 | Lee | |
| 2004/0223746 A1 | 11/2004 | Himeno et al. | |
| 2004/0228498 A1 | 11/2004 | Sekine | |
| 2004/0240684 A1 | 12/2004 | Cerasuolo et al. | |
| 2004/0252079 A1 | 12/2004 | Sheu et al. | |
| 2004/0260416 A1 | 12/2004 | Kellom et al. | |
| 2004/0267520 A1 | 12/2004 | Holley, II | |
| 2004/0268407 A1 | 12/2004 | Sparrell et al. | |
| 2005/0013443 A1 | 1/2005 | Marumoto et al. | |
| 2005/0024532 A1 | 2/2005 | Choi | |
| 2005/0031143 A1 | 2/2005 | Devantier et al. | |
| 2005/0031151 A1 | 2/2005 | Melillo | |
| 2005/0036064 A1 | 2/2005 | Lee | |
| 2005/0044100 A1 | 2/2005 | Hooper et al. | |
| 2005/0074135 A1 | 4/2005 | Kushibe | |
| 2005/0110875 A1 | 5/2005 | Ma et al. | |
| 2005/0114899 A1 | 5/2005 | Shih et al. | |
| 2005/0123165 A1* | 6/2005 | Yang | 381/386 |
| 2005/0128349 A1 | 6/2005 | Takamori et al. | |
| 2005/0131558 A1 | 6/2005 | Braithwaite et al. | |
| 2005/0132401 A1 | 6/2005 | Boccon-Gibod et al. | |
| 2005/0144458 A1 | 6/2005 | Venkatesan et al. | |
| 2005/0144468 A1 | 6/2005 | Northcutt et al. | |
| 2005/0146251 A1* | 7/2005 | Gillengerten | 312/8.16 |
| 2005/0251823 A1 | 11/2005 | Saarikivi | |
| 2005/0259181 A1 | 11/2005 | Watanabe | |
| 2005/0281289 A1 | 12/2005 | Huang et al. | |
| 2005/0283264 A1 | 12/2005 | Du Breuil | |
| 2006/0020354 A1 | 1/2006 | Lorkovic | |
| 2006/0041920 A1 | 2/2006 | Chaney | |
| 2006/0062397 A1 | 3/2006 | Cooper | |
| 2006/0062401 A1 | 3/2006 | Neervoort et al. | |
| 2006/0126878 A1 | 6/2006 | Takumai et al. | |
| 2006/0140418 A1 | 6/2006 | Koh et al. | |
| 2007/0116306 A1 | 5/2007 | Riedel et al. | |

FOREIGN PATENT DOCUMENTS

| | | |
|---|---|---|
| WO | 0108366 | 2/2001 |
| WO | 0126056 | 4/2001 |
| WO | 0221505 | 3/2002 |
| WO | 0241664 | 5/2002 |
| WO | 02067577 | 8/2002 |
| WO | WO 03065761 A1 * | 8/2003 |

OTHER PUBLICATIONS

Final Office Action dated Dec. 1, 2008 (from copending U.S. Appl. No. 11/145,010).
Meridian DSP Loudspeaker User Guide, 2001, pp. 1-12.
Final Office Action dated Apr. 29, 2009 (from co-pending U.S. Appl. No. 11/425,510).
Office Action dated Sep. 17, 2008 (from co-pending U.S. Appl. No. 11/425,510).
International Search Report dated Sep. 22, 2008.
HuMax Easy Digital DRT 800 TiVo DVD Recorder, 2004.
HuMax Easy Digital DRT 400 TiVo DVD Recorder, 2004.
Non-Final Office Action issued on Nov. 7, 2013 in U.S. Appl. No. 11/384,441.
Non-Final Office Action issued on Apr. 6, 2006 in U.S. Appl. No. 11/145,010.
Non-Final Office Action issued on Oct. 31, 2006 in U.S. Appl. No. 11/145,010.
Final Office Action issued on Jul. 27, 2007 in U.S. Appl. No. 11/145,010.
Non-Final Office Action issued on Mar. 31, 2008 in U.S. Appl. No. 11/145,010.
European Search Report issued on Jan. 12, 2007 in EPO Patent Application No. 05028234.2.
Notice of Allowance issued on Sep. 10, 2009 in U.S. Appl. No. 11/145,010.
Non-Final Office Action issued on Nov. 14, 2006 in U.S. Appl. No. 11/204,375.
Final Office Action issued on Mar. 29, 2007 in U.S. Appl. No. 11/204,375.
Non-Final Office Action issued on Sep. 12, 2007 in U.S. Appl. No. 11/204,375.
Final Office Action issued on Apr. 7, 2008 inr U.S. Appl. No. 11/204,375.
Non-Final Office Action issued on Apr. 25, 2012 in U.S. Appl. No. 11/204,375.
Final Office Action issued on Aug. 15, 2012 in U.S. Appl. No. 11/204,375.
Non-Final Office Action issued on Nov. 30, 2012 in U.S. Appl. No. 11/204,375.
Final Office Action issued on Apr. 4, 2013 in U.S. Appl. No. 11/204,375.
Non-Final Office Action issued on Jul. 19, 2013 in U.S. Appl. No. 11/204,375.
Final Office Action issued on Nov. 1, 2013 in U.S. Appl. No. 11/204,375.
Non-Final Office Action issued on Aug. 4, 2008 in U.S. Appl. No. 11/384,442.
Non-Final Office Action dated Mar. 18, 2008 for U.S. Appl. No. 11/384,337 issued.
Final Office Action dated Oct. 21, 2008 for U.S. Appl. No. 11/384,337 issued.
Notice of Allowance dated Mar. 12, 2009 for U.S. Appl. No. 11/384,337 issued.
Non-Final Office Action issued on Jun. 17, 2008 in U.S. Appl. No. 11/198,356.
Jon Krumm, et al., "Multi-Camera Multi-person Tracking for EasyLiving", Third IEEE International Workshop on Visual Surveillance Jul. 1, 2000, Retrieved from the internet <http://research.microsoft.com/research/pubs/view.aspx?type=Publicataion&id=693>, entire document, especially p. 1.
Anthony Kongats, et al., CAP-XX, Inc., Oct. 17, 2004, Retrieved from the internet <URL http://www.cap-xx.com/news.luxrsrch_cxxprofile_04-1017.pdf>, entire documents, especially p. 2.
Final Office Action issued on Oct. 30, 2008 in U.S. Appl. No. 11/198,356.
Final Office Action issued on Mar. 18, 2009 in U.S. Appl. No. 11/198,356.
Non-Final Office Action issued on Sep. 2, 2009 in U.S. Appl. No. 11/198,356.
Non-Final Office Action issued on Jan. 22, 2010 in U.S. Appl. No. 11/198,356.
Final Office Action issued on Jun. 8, 2010 in U.S. Appl. No. 11/198,356.
Non-Final Office Action issued on Sep. 20, 2010 in U.S. Appl. No. 11/198,356.
Final Office Action issued on Jan. 24, 2011 in U.S. Appl. No. 11/198,356.
Notice of Allowance issued on Apr. 29, 2011 in U.S. Appl. No. 11/198,356.
Non-Final Office Action issued on Apr. 16, 2009 in U.S. Appl. No. 11/319,774.

(56) References Cited

OTHER PUBLICATIONS

Notice of Allowance issued on Feb. 22, 2010 in U.S. Appl. No. 11/319,774.
Non-Final Office Action issued on Dec. 11, 2009 in U.S. Appl. No. 11/319,774.
Non-Final Office Action issued on Feb. 22, 2010 in U.S. Appl. No. 11/425,510.
Non-Final Office Action issued on Aug. 20, 2010 in U.S. Appl. No. 11/425,510.
Final Office Action issued on Feb. 8, 2011 in U.S. Appl. No. 11/425,510.
Notice of Allowance issued on Feb. 9, 2012 in U.S. Appl. No. 11/425,510.
Non-Final Office Action issued on Nov. 3, 2008 in U.S. Appl. No. 11/384,441.
Final Office Action issued on Jun. 12, 2009 in U.S. Appl. No. 11/384,441.
Non-Final Office Action issued on Dec. 30, 2009 in U.S. Appl. No. 11/384,441.
Non-Final Office Action issued on Jun. 11, 2010 in U.S. Appl. No. 11/384,441.
Final Office Action issued on Oct. 27, 2010 in U.S. Appl. No. 11/384,441.
Non-Final Office Action issued on Feb. 18, 2011 in U.S. Appl. No. 11/384,441.
Final Office Action issued on Jul. 7, 2011 in U.S. Appl. No. 11/384,441.
Non-Final Office Action issued on Oct. 27, 2011 in U.S. Appl. No. 11/384,441.
Final Office Action issued on Mar. 1, 2012 in U.S. Appl. No. 11/384,441.
Non-Final Office Action issued on Jun. 22, 2012 in U.S. Appl. No. 11/384,441.
Final Office Action issued on Oct. 4, 2012 in U.S. Appl. No. 11/384,441.
Non-Final Office Action issued on Jan. 16, 2013 in U.S. Appl. No. 11/384,441.
Final Office Action issued on Jul. 5, 2013 in U.S. Appl. No. 11/384,441.
Notice of Allowance issued on Mar. 20, 2014 in U.S. Appl. No. 11/384,441.
Non-Final Office Action issued on Mar. 20, 2014 in U.S. Appl. No. 11/204,375.
Bryston Instructions for 10B-STD, 10B-SUB and 10B-LR Crossovers, Bryston Ltd., pp. 1-9. Associated product available for sale at least since 2003.
Rane Data Sheet RPM 26z Programmable Multiprocessor, Rane Corporation, pp. 1-4. Associated product available for sale at least since 2003.
Notice of Allowance issued on Jun. 30, 2014 in U.S. Appl. No. 11/204,375.
Corrected Notice of Allowance issued Aug. 20, 2014, in U.S. Appl. No. 11/204,375.
Non Final Office Action issued on Apr. 6, 2015, in U.S. Appl. No. 14/456,673.
Non-Final Office Action issued Aug. 7, 2015, in U.S. Appl. No. 13/493,395.
Final Office Action issued Aug. 13, 2015, in U.S. Appl. No. 14/456,673.

\* cited by examiner

INTEGRATED AUDIO VIDEO SIGNAL PROCESSING SYSTEM USING CENTRALIZED PROCESSING OF SIGNALS

CROSS-REFERENCE TO RELATED APPLICATION

This application is a divisional of prior application Ser. No. 11/145,010, filed Jun. 6, 2005, which claims the benefit of U.S. Provisional Patent Application No. 60/640,085 filed Dec. 30, 2004, which are all hereby incorporated by reference for all purposes as if fully set forth herein.

FIELD OF THE INVENTION

The present invention is related to an audio/video integrated system using a centralized processing scheme. Traditionally, audio and video components have been developed separately. To ensure compatibility with other components made by different manufacturers, the industry has developed interfaces that can accommodate a wide range of products. This provides a limited number of interfaces between each component because a greater emphasis is placed on compatibility rather than quality. Therefore, each component has to output signals that are compatible with these standardized interfaces. This may cause significant loss and distortion of signals between the components because of the measures taken to make components communicate with each other. Also, each component currently has a separate control device for its operation, even though they operate integrally. So the present invention is directed to provide an integrated control of all the audio/video and other entertainment operations, preferably in one box.

BACKGROUND OF THE INVENTION

Currently, an integrated audio/video entertainment system, called a home entertainment system, is available. Each entertainment system requires at least three different components, which may include: a television (TV) or a video display; a video tape recorder (VTR) or digital versatile disk (DVD) player that mainly provides video signals to the display; but also provides an audio component. A home entertainment system may additionally include a set top box, which receives audio/video signals from, for example, an antenna, a cable, or a satellite dish, and a digital video recorder (DVR) that is either a separate component or integrated in the set top box.

Generally, consumers purchase these three or four components from more than one manufacturer. Even from the same manufacturer, each component may be bought separately and come in a separate box with independent functions. These components normally are made as separate independent devices because it is not known what other different components consumers may connect together to form a home entertainment system. For example, TV manufacturers make a TV as an independent, separate, stand-alone device, so that any kind of video source, whether it is a VTR, a DVD player, or a set top box, can be connected to the TV. This gives consumers a choice. Thus, TV manufacturers have to provide as many connection ports and interfaces as economically feasible. These standards are set by industry organizations, such as the International Organization for Standardization (ISO), the Institute of Electrical and Electronics Engineers (IEEE), and the National Television System Committee (NTSC).

One problem, however, is that TV manufacturers have to provide their TVs with at least one or two, if not all, of these interface terminals, plus any required interface converters.

Video source equipment manufacturers also have to provide many different types of interface terminals because they do not know which type of display device may be connected to their products, and they want to give consumers as many choices as possible. As a result, devices like VTRs and DVD players also have three or four different kinds of terminals or interfaces. Alternatively, manufacturers may only provide one kind of interface that provides widespread compatibility but sacrifices quality in doing so.

Audio source equipment and set top box manufacturers are no exceptions either. So if we look at these three or four different components making up a home entertainment system, each component is providing three or four different interfaces just to provide compatibility among the consumers' choice of equipment.

Because most of the interfaces were set up with the existing components in mind, the internal, or source, signals may have to be converted to output signals solely for the purpose of communicating between components even though these different components use similar internal signals for their internal processes. For example, component A and component B process signals in the same format internally, but these internal signals may have to be converted simply for transmitting signals between component A and component B.

In order to make different kinds of output signals available, every component needs to convert signals from the format, in which it is originally processed, to another format for transmitting output signals. Such a conversion may cause signal loss or distortion.

Many products like a receiver/boom box, a mini stereo system, or home theater in a box (HTIB) have been introduced to the market. However, these products are nothing but a simple physical integration of each component and do not provide any functional integration.

SUMMARY OF THE INVENTION

The present invention addresses these problems by providing a system that centrally processes audio/video and other information signals. This may eliminate unnecessary conversion of signals for communication between components, thereby preserving the characteristics of the original source signals and reproducing the purest possible source signals for delivery to end users, listeners or viewers via an output device, such as a display or speakers.

The present invention may also eliminate duplicative installation of conversion mechanisms for generating and receiving output signals currently present in most home electronics components. Therefore, a manufacturer may provide its products either at a lower price or equipped with better devices or components at the substantially same price.

The present invention may offer better performance when the source signals are all digitally coded and the output device is digitally operated.

The present invention provides a cost effective high end audio video reproduction system by centrally processing the functions that are now performed separately in each of the components. The present invention also enables the user to easily generate supplemental information on the musical and video contents and to broadly share such information to enhance the enjoyment of a viewing and listening experience.

The present invention can be achieved by functional decomposition of the existing components and combining those functions to be processed centrally, thus minimizing digital to analog or analog to digital conversions by processing all the signals digitally.

The invention discloses an integrated audio processing system including an audio source, a central processing unit adapted to be responsive to an audio signal from the audio source, and an amplifier configured to be responsive to a driving signal. The central processing unit includes a digital crossover module generating a plurality of speaker driving signals having different ranges of frequencies.

A dummy speaker may also be provided that is driven directly by current generated by the amplifier from the speaker driving signals.

The invention also discloses a method for reproducing sound including, capturing an audio signal from an audio source, processing the captured audio signal in a central processing unit, dividing the processed audio signal into a plurality of speaker driving signals having different frequency ranges, generating a plurality of speaker driving currents in response to the corresponding plurality of speaker driving signals, and driving a plurality of speakers with the plurality of speaker driving currents to reproduce sound.

The invention further discloses a speaker system including a plurality of interchangeable speaker modules, each speaker module includes a speaker driving unit. The speaker modules are adapted to be removably coupled to a speaker housing or to each other.

The invention further discloses an integrated audio/video processing supplier. These integrated systems may use a PC architecture. These integrated systems may also have amplifiers that drive the speaker in the same housing where a central processing unit resides.

DETAILED DESCRIPTION OF THE INVENTION

In addressing the problem as described above, the present invention discloses a system and method that may eliminate digital-analog conversions that are essential for interface compatibility among typical home electronic products. The present invention takes the most advantage of audio and video signals recorded in a digital format. However, the present invention is not limited thereto, and can be used with traditional analog audio/video sources.

Figure 1:
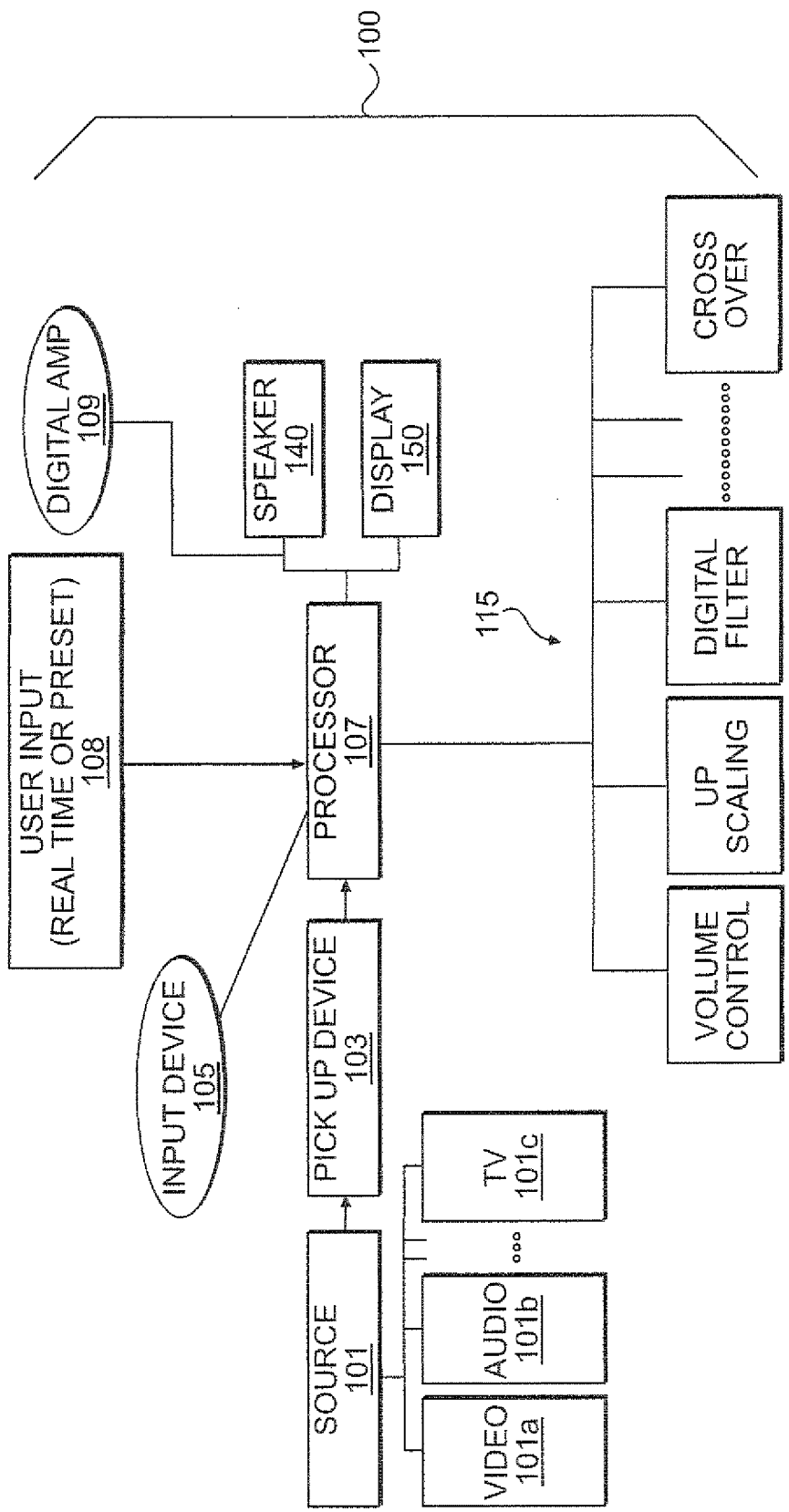
FIG. 1 shows a schematic block diagram for an integrated audio/video system according to an embodiment of the present invention.

FIG. 1 shows a schematic diagram for an embodiment of the present invention. The integrated audio/video system 100 includes a main processor 107 that receives an input signal from a signal pick-up device 103, which acquires a source signal from a source 101 such as, for example, a video source 101a, an audio source 101b, or a TV tuner 101c. The input signal is preferably a digital signal, but could be any type of audio/video signal, like an analog signal from a phonograph.

The processor processes the input signal according to a user input 108. The user input can be real time, such as adjusting volume or tone, or pre-set parameters.

The output signals from processor 107 are also preferably digital signals. In an embodiment of the present invention, the signals are processed mostly by software but the present invention is not so limited. If necessary, a peripheral device, such as a specialty chip or graphic chip, can be used to process signals from the source for a specific purpose like upsampling data from an audio source or acting as a digital filter for video signals. In that case, the main processor 107 still communicates with the peripheral devices via digital signals.

The output signals from the main processor go to the output devices. For example, video signals are directly sent to video display 150. Modern video displays like a Liquid Crystal Display (LCD), a Plasma Display Panel (PDP), or a Digital Light Processing™ (DLP) projector can take full advantage of the digital signal output from the main processor.

Audio signals may pass through an amplifier 109, which is preferably digital, in order to generate currents that can drive speakers. A speaker that can be driven by the digital signal instead of currents, however, may eliminate the need for a digital amplifier.

Figure 2:
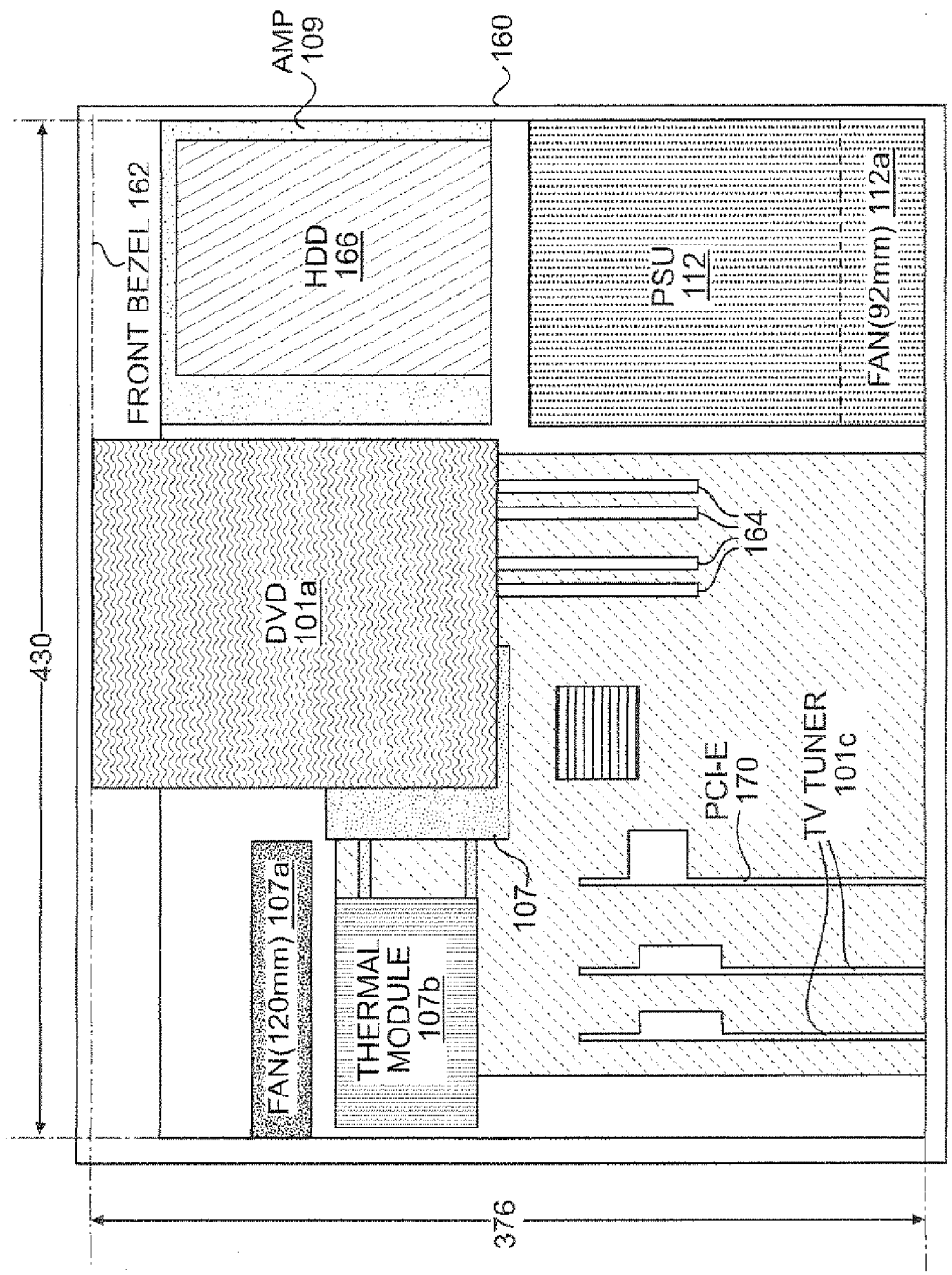
FIG. 2 shows a layout of an embodiment of the present invention in a PC architecture.

An embodiment of the present invention may use a personal computer (PC) architecture, as shown in FIG. 2, and use a general purpose central processing unit (CPU), such as an Intel Pentium® 4 and its peripheral devices that can run widely available operating systems like, for example, Microsoft Windows® or Linux. However, the present invention is not limited thereto, and other processors, architectures, or operating systems may be used. Further, the present invention creates a need to develop a new operating system for controlling a home entertainment system and providing other features such as Internet access, word processing, as well as other office or work-related applications.

An embodiment of the present invention uses a DVD drive 101a commonly used in most PCs for a source, or any type of optical memory drive device or optical media device, but the source could be an analog VCR source, a TV tuner, an FM/AM radio tuner, a USB port, an Internet connection, or other sources known by those having skill in the art. As shown in FIG. 2, the DVD drive may be included in the same housing as the processor as known in a typical PC architecture. Also, an amplifier for driving a speaker system (more than one speaker unit) may be included in the same housing. Furthermore, there may be a plurality of amplifiers. The amplifiers may be analog and/or digital. According to one embodiment of the present invention, there may be at least one analog amplifier among this plurality of amplifiers.

An embodiment of the present invention may include an LCD, PDP, or DLP™ projector as the display device 150, any other display device that can operate in a digital mode may also be suitable. However, under certain circumstances, analog display devices may also be used.

Now each component of the present invention will be described.

Figure 3:
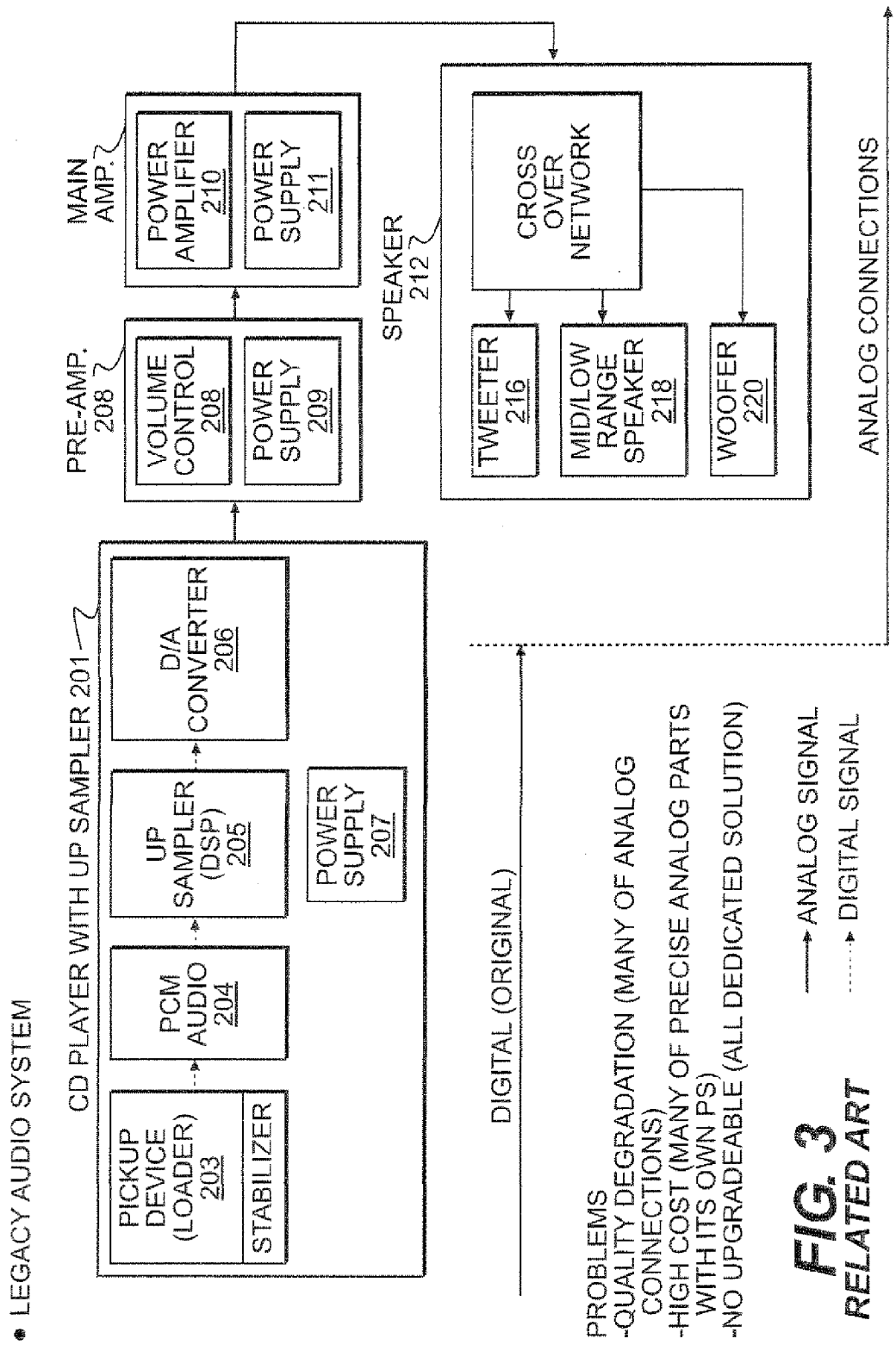
FIG. 3 shows a schematic block diagram for a typical audio reproduction system.

FIG. 3 is a schematic diagram of a known audio reproduction systems. A source player picks up a source signal from various sources. For illustration, the most commonly used music source today, a compact disc (CD) player 201 will be used as the source.

In a CD player, a laser pick-up device 203 reads music signals decoded on CD 201. The signal read by laser pick-up device 203 is a digital code, which is a combinations of zeroes and ones, and the digital signal is decoded by a pulse code modulator (PCM) 204, which is a digital representation of analog data. The digital code is converted into analog signals by a processor 206 that is embedded into the player or may be separately packaged. A pre-amplifier 208 receives the analog signals and may manipulate them by adjusting their volume and tone. Signals can be manipulated either in an analog or digital format. A power amplifier 210 receives output from pre-amplifier 208 and generates currents that can drive speakers 212. Speakers 212 receive the outputs from power amplifier 210 and divide the signals using internal crossover logic. Each of the CD player 201, pre-amplifier 208, and power amplifier 210 includes a respective separate power source 207, 209, 211. In a 3-way speaker system, crossover logic 214 divides the signal into a high frequency range, a mid frequency range, and a low frequency range. The high frequency range signal drives a tweeter 216, the mid frequency range signal drives a mid-range unit 218, and the low frequency range signal drives a bass unit 220.

An upsampler 205 may be added between source player/data pick-up device 203 and processor 206. Upsampler 205 increases the sampling rate of conventional CD's 44.1 KHz up to 98 KHz or higher. Upsampling provides much better quality of audio sound reproduction.

The above-described audio reproduction system converts an original audio digital signal into an analog signal for further processing. However, digital processing provides more precise control of sounds and better noise reduction. Therefore, higher end audio equipment typically manipulates such signals digitally and in that case, the analog signals converted from the digital source code are converted into a digital format again. Additional signal conversion may also be necessary in the power amplifier as well as in the pre-amplifier. The repeated conversions of signals from analog to digital and digital to analog may cause data loss or distortion.

The present invention may solve these problems by taking the digital signals read by the laser pick-up device and having the necessary signal manipulation performed by one powerful main processor that generates speaker driving signals for a power amplifier, which is preferably a digital amplifier.

Figure 4:
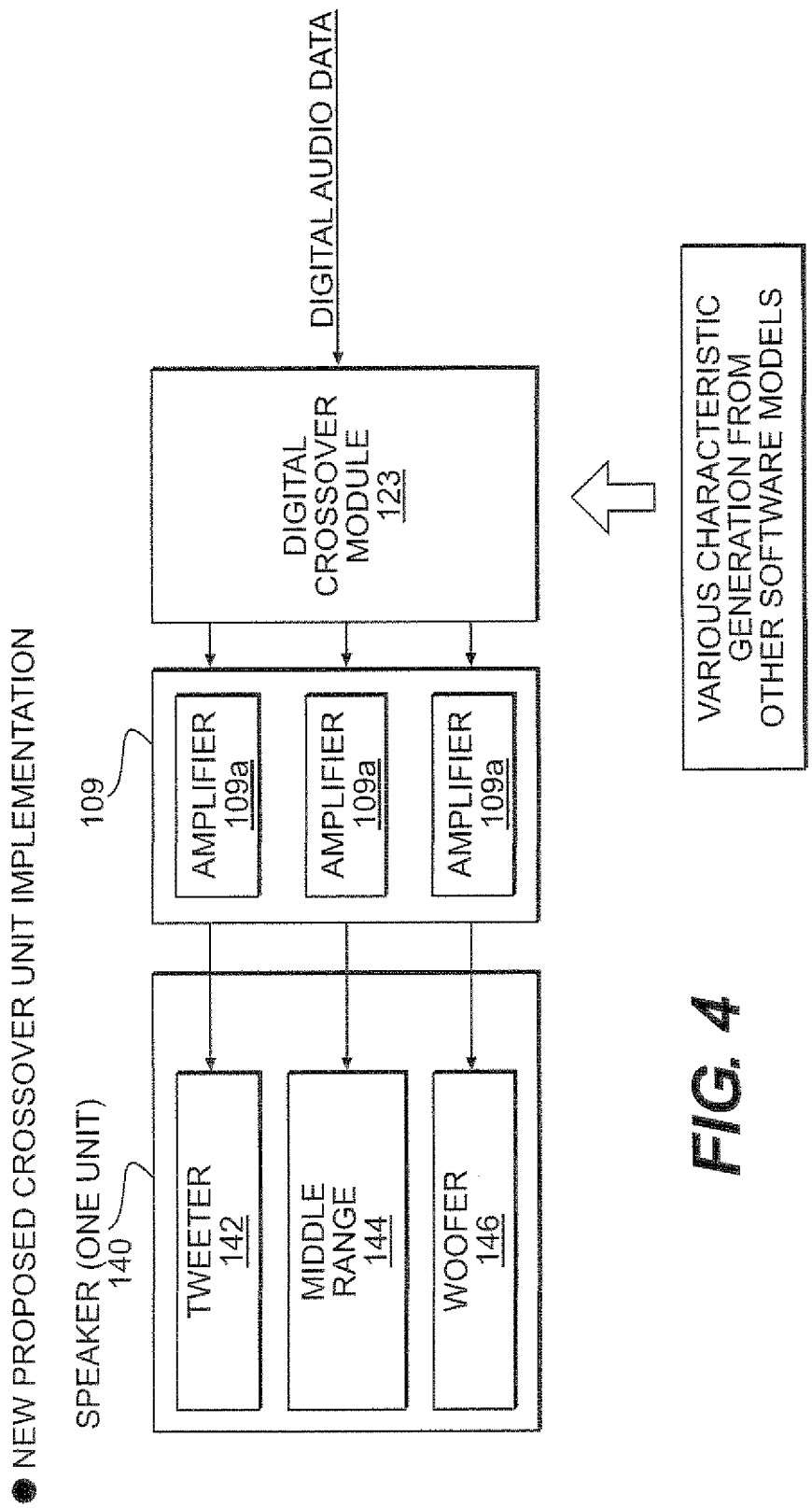
FIG. 4 shows a schematic block diagram for a digital crossover system according to an embodiment of the present invention.

Referring to FIG. 4, integrated audio/video system 100 may include a digital crossover 123, which can be implemented as a software module 115. Using the crossover module, main processor 107 can divide the processed audio signal into signals of different frequency ranges and directly send the divided speaker driving signals to respective digital amplifier units 109a of amplifier 109, which in turn drives a speaker unit 142, 144, 146 of dummy speaker 140 corresponding to the frequency range of the supplied speaker driving signal. Digital amplifier 109 may use pulse width modulation (PWM), for example, to generate the appropriate current for driving the speakers.

Moreover, amplifier 109 may be a hybrid amplifier that includes an analog amplifier unit and a digital amplifier unit. Analog amplifiers may be more suitable for driving high frequency speaker units such as tweeter 142, while digital amplifiers may be more suitable for driving high power low frequency speaker units such as woofer 146.

High quality audio with precise crossover point control can be easily obtained by using digital crossover. Each digital driving current provides a speaker driving current to a respective speaker driving signal from the digital crossover module. Because the crossover may be digitally controlled by a software module, the various signal characteristics can be dynamically reconfigured.

Furthermore, centrally processing the digital audio signals using a main processor enables the implementation of digital volume control, upsampling, and digital filtering, for example, by simply adding a software module. These processing functions can also be achieved using peripheral hardware capable of digital signal manipulation that is coupled to the main processor.

Digital filtering can emulate the acoustical characteristics of the outputted audio to meet an individual listener's musical tastes, such as reproducing the characteristics of audio coming from a tube amplifier or a phonograph. Software based crossover logic may provide more precise control of frequency crossover at a much lower cost. It also can provide dynamic configuration of the crossover frequencies, which together with the modules controlling other acoustical characteristics, provide optimal control of audio output.

The present invention may use a PC architecture as shown in FIG. 2. A new scheme of using a digital power amplifier has been developed so that it can be used under the existing PC architecture. Thus, a single housing 160 having a typical front bezel 162 may have disposed therein: a source such as a DVD player 011a, a processor 107 having cooling elements like a fan 107a and a thermal module 107b, a system memory 164, a hard disk drive 166 or other mass storage device, a power supply 112 and cooling fan 112a, and expansion slots 170. Other hardware and software can be incorporated into the PC architecture such as, for example, a TV-Tuner 101c, an amplifier 109 digital and/or analog, a digital video output card, and a variety of PC interfaces like universal serial bus (USB), Firewire (IEEE 1394), a network interface card, a variety of software control modules 115, and a typical PC operating system like Windows®, Linux or Mac OS®, just to name a few.

Figure 5:
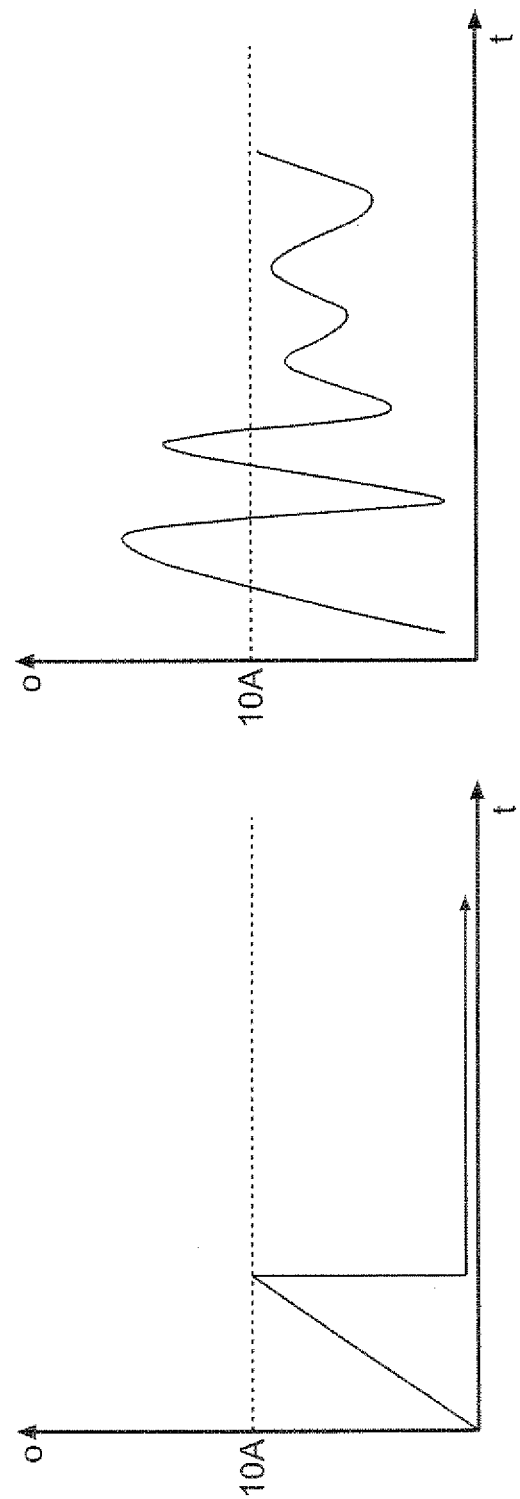
FIG. 5 shows PC switching power characteristics and an exemplary power consumption wave for sound reproduction.

Looking at FIG. 5, however, a PC will normally shut down if it experiences a certain current power threshold level, which is 10 A here. However, a typical home entertainment system may briefly experience current levels in excess of a PC's threshold when the amplifier generates high powered driving current, like for certain high power bass frequencies. Accordingly, a system according to the present invention must be able to exceed a PC current threshold level when a PC architecture is used to implement an integrated audio/video processing system. Therefore, the system may provide a power tank coupled to power unit 112 to manage the spikes in current to prevent system shutdown when high powered signals are required to be driven.

Looking at FIG. 1, signal pick-up device 103 picks up a signal from source 101. Once the signal is picked up, the signals are computed or manipulated through processor 107, and the final output is a digital signal or driving currents from digital amplifier 109. If the signal comes from an analog source, it is converted into a digital signal, by a method like PCM, so that it may be processed digitally throughout the system. This conversion can be performed by main processor 107. The input audio signal from source 101 is fed into main processor 107, which makes necessary computations to control volume or tone (i.e., bass or treble), or performs functions such as upsampling or other digital compensation by software emulation via modules 115. The signal then goes to digital amplifier 109, which provides the current necessary to drive a speaker unit 142, 144, 146 of an appropriate frequency range based on the processed audio signal.

Alternatively, the processed digital speaker driving signal could be delivered to a digital amplifier disposed within dummy speaker 140 over a digital connection such as a USB cable or a Firewire connection, or any other suitable digital connection. Inside are digital amplifier units for generating current to drive the speaker units 142, 144, 146.

Figure 6:
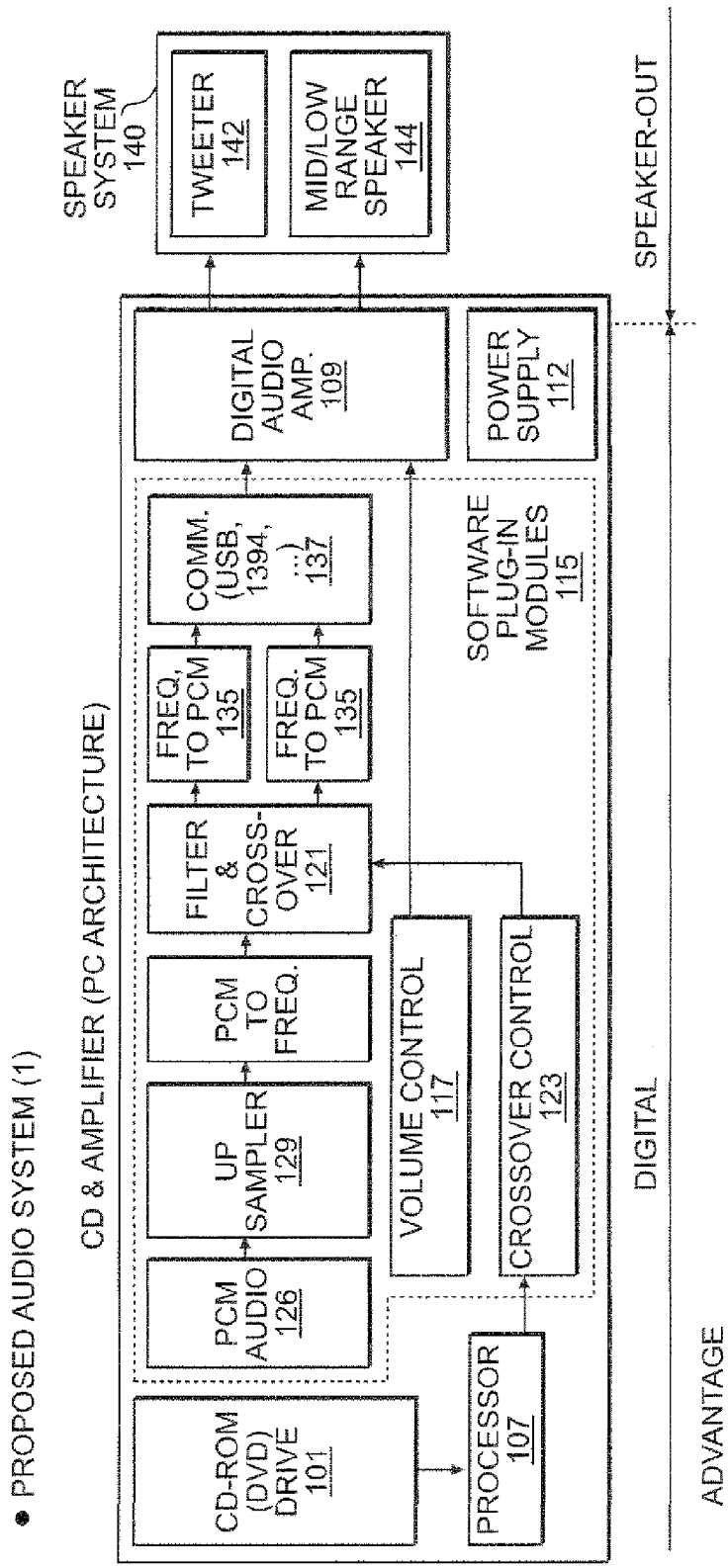
FIG. 6 shows a schematic block diagram for an audio reproduction system according to an embodiment of the present invention.
Figure 7:
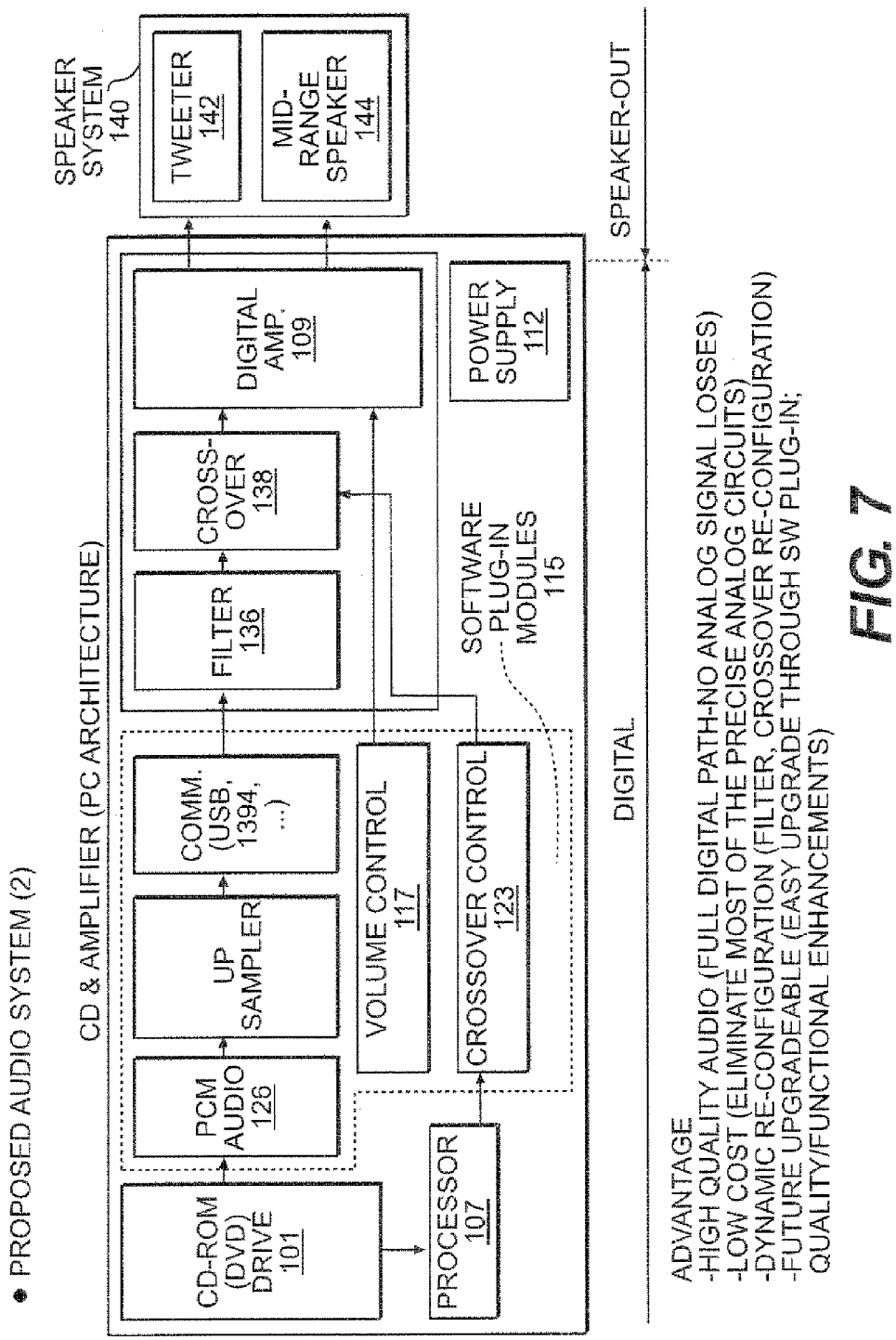
FIG. 7 shows a schematic block diagram for an audio reproduction system according to another embodiment of the present invention.

A feature of the present invention is that the crossover network filtering the audio signal into different frequency ranges may be implemented within the processor, thereby eliminating the crossover network in a typical analog system comprising a set of coils, capacitors, and resistors located within a speaker. The analog crossover network does not provide as precise separations of frequencies as the digital crossover performed by main processor 107 using software 123 as shown in FIG. 6. Alternatively, the digital crossover may be performed by peripheral device 138 in communication with main processor 107 as shown in FIG. 7. Very expensive analog components are required for an analog crossover to even be comparable to a digital crossover. Moreover, the frequency ranges provided by the digital crossover network may be easily adjusted such that a speaker driving signal containing the most optimal range of frequencies is delivered to a given speaker unit. Also, the frequency ranges may be dynamically adjusted while an audio source, like music, is playing. Accordingly, the speaker system may not require cross-over logic. Instead, main processor 107 may send out two, three or several different kinds of speaker driving signals via respective amplifier units 109 that might be directly connected to tweeter, mid-range, or bass unit of the speaker.

FIG. 6 illustrates an audio system according to an embodiment of the present invention that includes an audio source 101 like a CD player, software modules 115 coupled to processor 107, an amplifier 109, and a dummy speaker 140 having no crossover logic. The software modules may include: a volume control module 117, crossover module 123, a PCM module 126, an upsampler module 129, a PCM/frequency converter 131, a digital filter 121, a frequency/PCM converter 135, and a communication driving module 137. Crossover module 123 can separate filtered digital audio signals into different frequency ranges, which are delivered to a respective frequency/PCM module 135 for each range. The signals may be converted by communication driving module 137 or delivered directly to digital amplifier 109. Amplifier 109 comprises a plurality of amplifier units 109a that correspond to a given frequency range of a speaker unit 142, 144 of dummy speaker 140.

FIG. 7 is similar to the previously described audio system but shows that some of audio processing functions may be instead performed by peripheral hardware devices like filter 136 and crossover 138 coupled to processor 107.

The system provides additional digital control of audio signals thereby permitting the delivery of tailored speaker driving signals to the dummy speaker.

These dummy speakers according to an embodiment of the present invention may also be modified in a Lego®-like modular fashion because they are not limited by the fixed crossover frequency range logic generally contained in a typical speaker. Therefore, a user can switch out individual speaker sub-units to obtain an optimal listening experience based on that user's preferences or the type of media the user listens to.

The present invention also provides another benefit by integrating all the processing and computation within a main processor. For example, by using digital filters, the present invention can provide the characteristics and feeling of the softness and warmth of tube amplifiers, or a phonograph. Also, the present invention can easily provide the functionality of an equalizer, an upscaler, or a digital crossover network.

Figure 8:
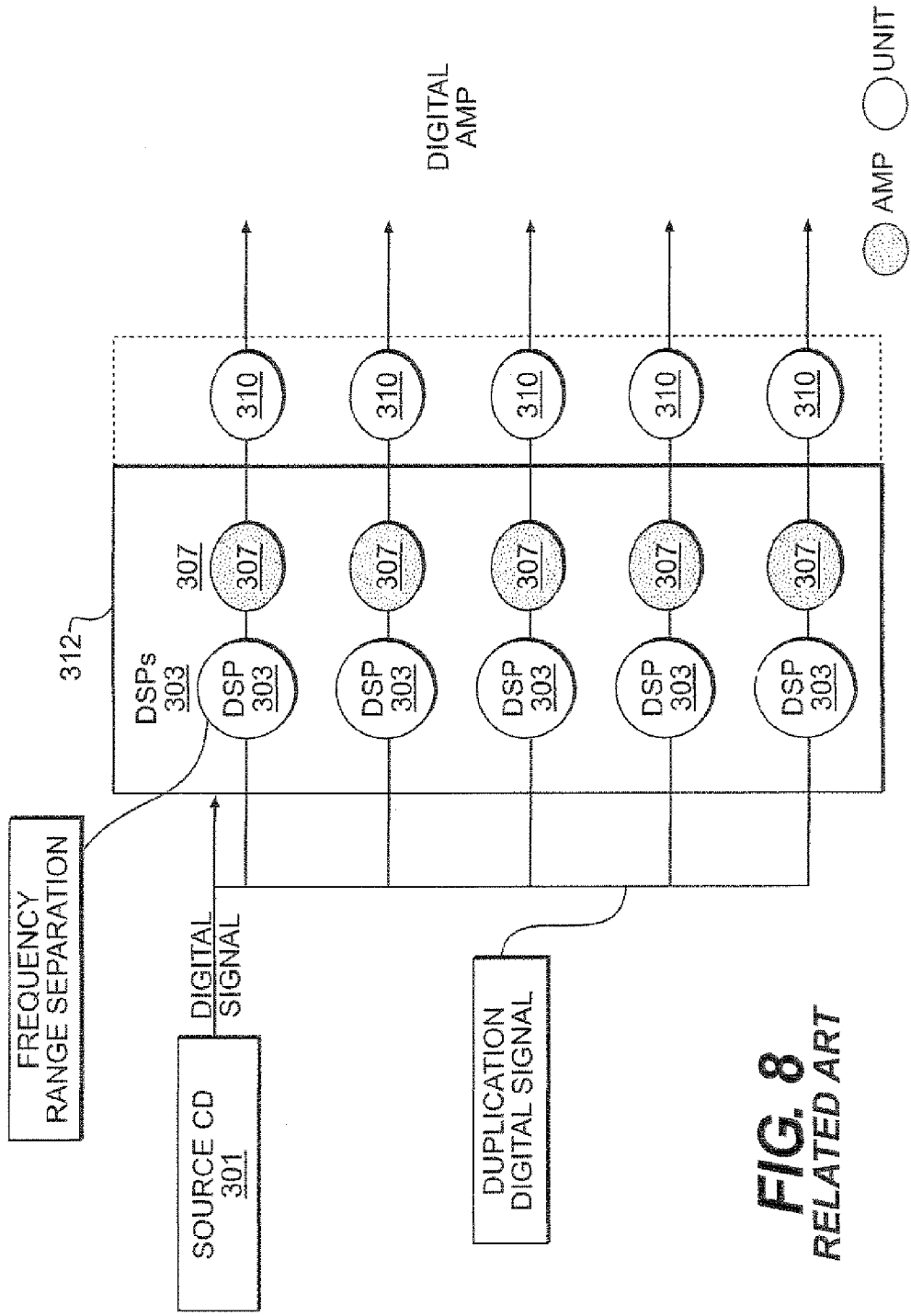
FIG. 8 shows a schematic block diagram for a typical digital crossover system.

Presently, a digital crossover network is sold as a separate component and one design of such a device, known as an "active" speaker 312, is shown in FIG. 8. It is nothing but a combination of separate digital signal processors (DSPs) 303 and separate digital amplifiers 307. In other words, digital signals from a source 301 like a CD player are separated using four or five different DSPs. Each DSP 303 provides signals of different frequency ranges that are delivered to a respective digital amplifier 307, which generates driving currents for each speaker unit 310. The present invention can implement these functions in one processor, which may have a PC architecture disposed therein, without adding expensive equipment. Furthermore, by adopting such architecture, the present invention allows dynamic adjustment of frequency levels. In other words, the present invention enables user to adjust the frequency levels to whatever level whenever he or she wants to, by simply entering the ranges through the conventional input device, or automatically as programmed before. On the other hand, the typical digital crossover network does not provide such features and convenience of use.

Now turning to video display, the most popular video sources are currently analog TV, DVD, and digital TV.

Figure 9:
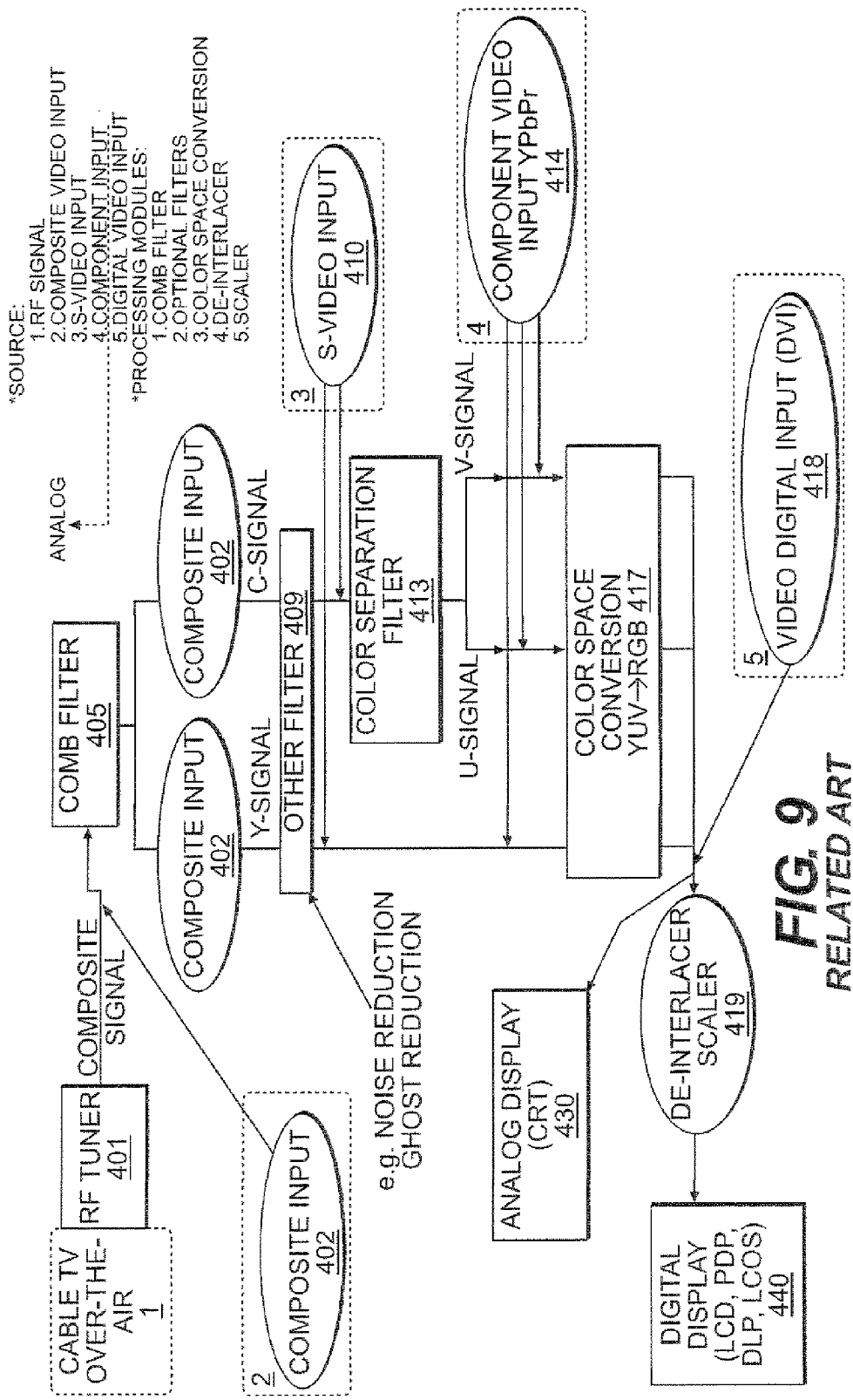
FIG. 9 shows a schematic block diagram for a typical TV set.
Figure 10:
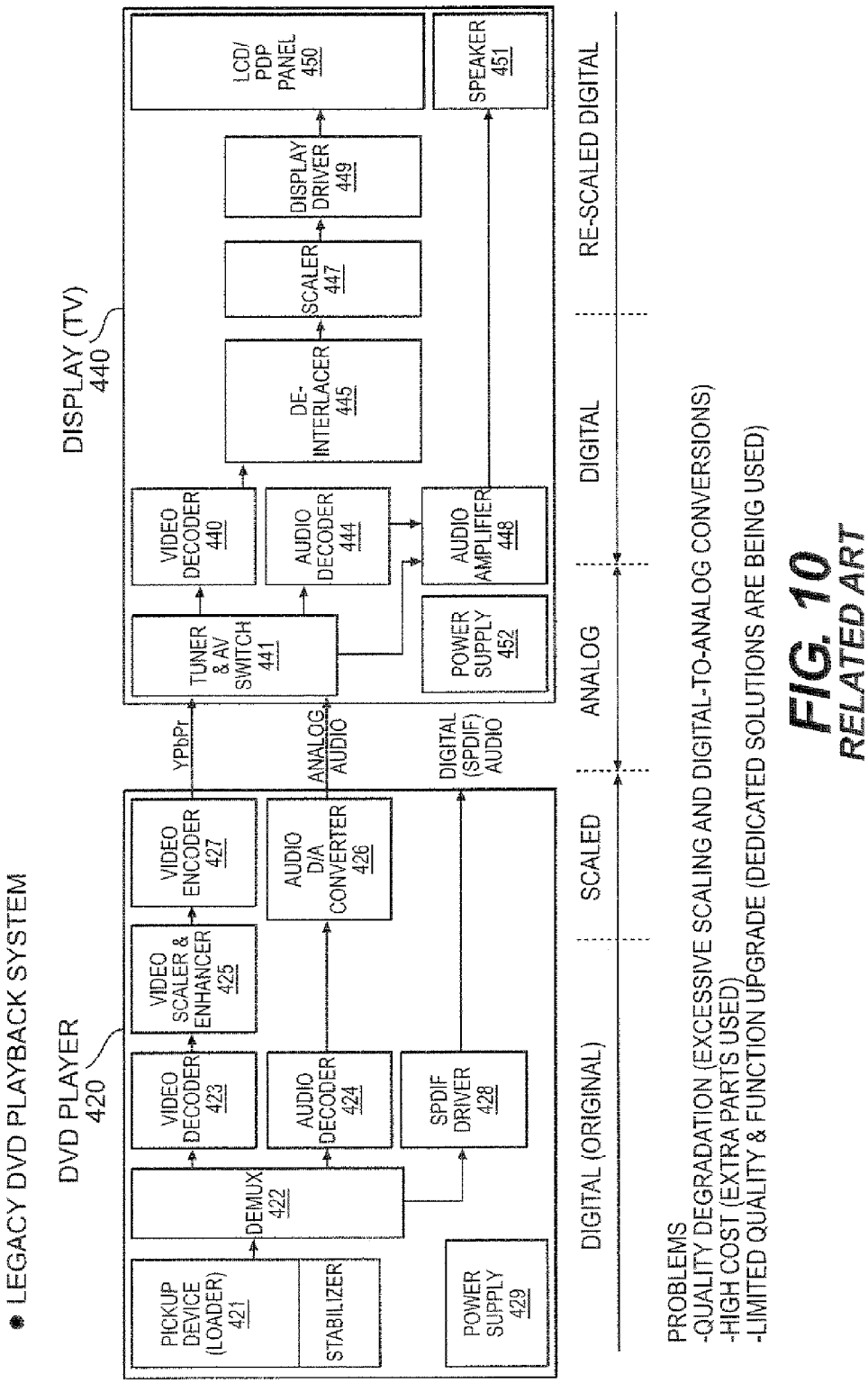
FIG. 10 shows a schematic block diagram describing an operation a known video system with a typical DVD player and display.

FIG. 9 shows a schematic block diagram of a typical analog TV display and FIG. 10 shows a schematic block diagram of a known DVD display configuration. Signals selected by a tuner 401, which is a composite signal, go through a filter such as a 3D comb filter 405 to produce a luminance signal (Y-signal) and a color signal (C-signal). A composite signal may also come from a composite input 402 of another video source such as a VTR. The Y-signal and the C-signal pass through a second filter 409 for ghost reduction and noise reduction. The C-signal then goes through a color separation filter 413 to generate a blue signal (U-signal) and a red signal (V-signal). The U-signal and the V-signal together with the Y-signal form a component signal having YUV data in a conversion filter 417. Images are displayed using an RGB signal from the YUV data.

If an S-Video input 410 is used, the signal does not need to pass through either comb filter 405 or second filter 409 because the Y-signal and C-signal are kept separate.

DVD may contain YUV data in a 720×480 format. Digital TV broadcasts YUV data encoded using MPEG 2 protocol. Digital TV may have different formats such as, for example, 1080i, 720p and 480p. Digital video sources also may provide different interface protocols such as component video (Y Pb Pr), high definition multimedia interface (HDMI) and digital video interface (DVI). A component video interface 414 keeps the Y-signal, the U-signal, and the V-signal separate such that the video signal can be delivered directly to conversion filter 417. Output source signals from digital interfaces like DVI or HDMI 418 for a digital display 440 can be input directly to the de-interlacer scaler 419 and do not need to pass through any of the filters that may be required for an analog display 430. Thus, a digital display 440 only needs additional signal filtering to be compatible with analog interfaces, even though the original source may be digital, like a DVD or digital TV.

For example, in the typical DVD playback system of FIG. 10, there is a DVD player 420 and a display device 440. DVD player 420 includes a pickup device 421, a demux 422, a video decoder 423, a video scaler and enhancer 425, and a video encoder 427 for processing a video signal. DVD player 420 further comprises an audio decoder 424 and a digital/analog converter 424 for providing analog audio signals, and a SPDIF driver 428 for providing digital audio signals. Display device 440 includes a tuner 441, video decoder 442, de-interlacer 445, a scaler 447, a display driver 449, and a display apparatus 450 for displaying video signals. Moreover, display device 440 includes an audio decoder 444, an amplifier 448, and a speaker 451 for providing audio output. Both DVD player 420 and display device 440 include a respective power supply 429, 452. It is apparent to a person having ordinary skill in the art that there are many redundancies in the functions of the DVD player 420 and display device 440, which is in part caused by the requirement to convert audio/video signal to allow signal communication between these components.

In addition, while a DVD player 420 may have a digital interface like DVI or HDMI, the additional processing components in display device 440 are still needed because the DVD player cannot dynamically adapt for the resolution of the display and the display is required to be compatible for a wide range of non-digital interfaces.

Further, to accommodate various formats and interfaces, many display devices provide at least three different interface terminals. In some cases, they provide five different terminals. Video source players often provide many different terminals as well. These interfaces are both analog and digital.

Therefore, each video source player and each video display has its own converter that can convert signals coming through different interfaces into YUV data. Moreover, the display may include many image filters as described above for processing the analog signals from many different interfaces into YUV data for display. These additional and sometimes redundant components may be easily eliminated by the present invention.

Also, a digital video display requires an additional processing step for image display. Modern video displays, such as an LCD, a PDP or a DLP™ projector, have a native resolution, for example, 1920×1080, 1280×720 or 865×480. These resolutions are fixed when the displays are manufactured, because they have a maximum number of lines and a maximum number of pixels per line.

Therefore, once a digital display device receives a video source signal, it has to resize, or scale, the signal to make it fit for the panel size using de-interlacer/scaler 419.

Figure 11:
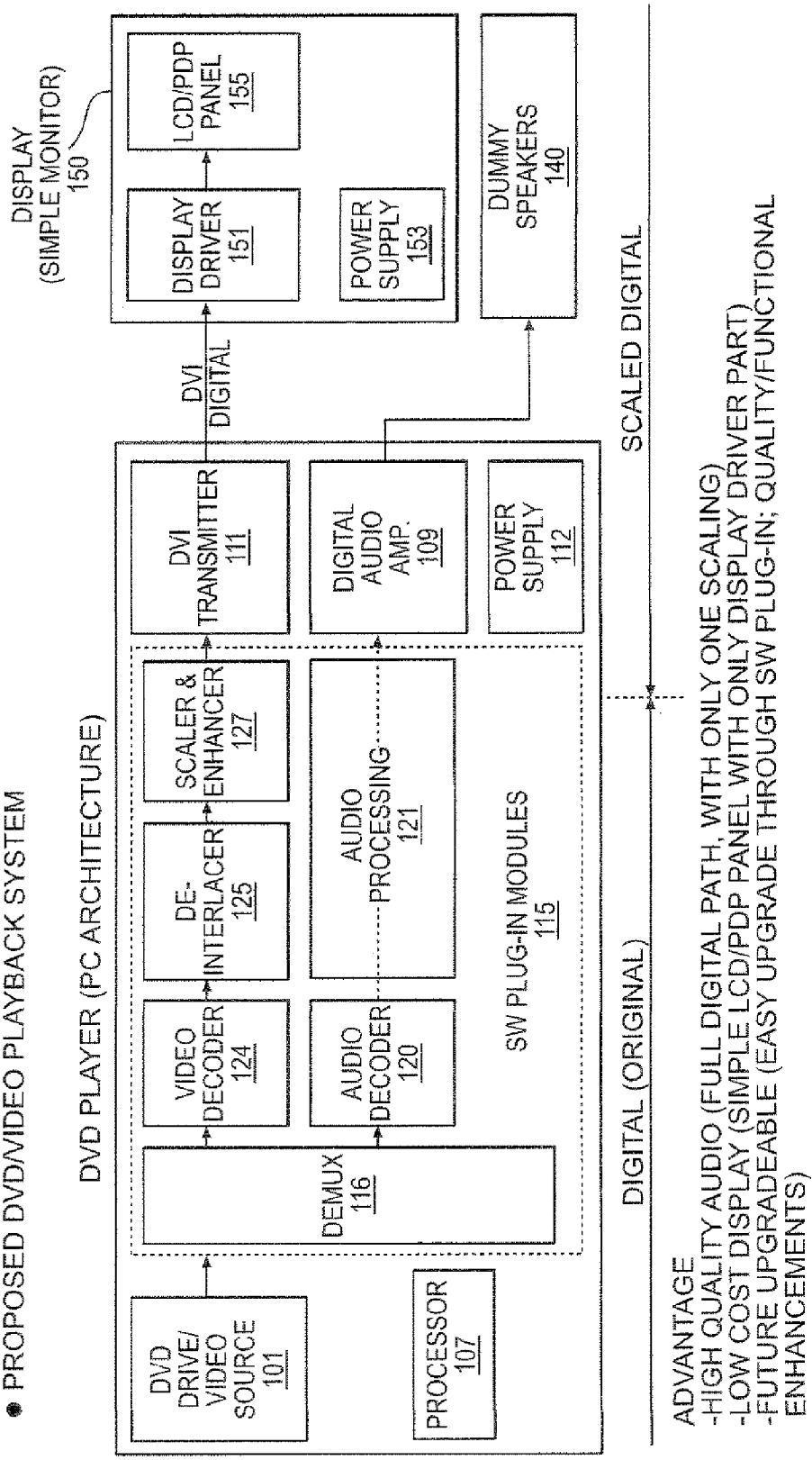
FIG. 11 shows a schematic block diagram for a video reproduction system according to an embodiment of the present invention.

FIG. 11 shows that the present invention, however, can perform such resizing using main processor 107 coupled to software modules 115. Other compensation and manipulation of the video signals can be also performed in the main processor, which may be coupled to a variety of software modules, including: a demux 116, a video decoder 124, a de-interlacer 125, a scaler and enhancer 127, an audio decoder 120, and audio filter or processor 121 Here, main processor 107 uses software modules 115 to process the signal from source 101, which can be digital or analog. Signal processing can also be performed, however, by peripheral hardware devices coupled to processor 107.

The processed audio/video signals are delivered to a DVI transmitter 111 and a plurality of amplifier units of amplifier 109. If amplifier is analog or a digital/analog hybrid, a conversion of the digital signals can be performed by audio processor 121 or in amplifier 109 itself. The processed video signals are sent to a dummy display 150 that may comprise simply a display driver 151, a power supply 153, and a digital display device 155. The amplified audio signals are sent to dummy speaker 140 in a similar manner as described above.

Accordingly, high quality audio and video can be provided due to the full digital signal path with only one scaling performed in the processor. Further, the display can be easily upgraded by adding a new software plug-in, thereby enhancing both display quality and function.

Therefore, the display's manufacturing costs may be dramatically reduced by connecting a dummy display device that does not contain any devices for processing or converting video signals to the integrated main processor box. Instead, a simple LCD/PDP panel with only driver parts may be used that can provide a high-resolution display at a greatly reduced cost. Because of the processing power that a CPU such as an Intel Pentium® 4 provides, main processor 107 can perform most of a conventional TV's functions, such as, for example, tuning, filtering, signal selecting, de-interlacing, and resizing.

Even from an analog TV source, once a composite signal is selected from RF signals, the present invention can digitally capture the composite signal and perform all the filtering operations to generate YUV/RGB signals for display using software modules plugged in to main processor 107, or peripheral devices associated therewith. Therefore, by digitally processing even the typical analog TV signals, most of the analog components may be eliminated to substantially reduce the signal loss and distortion caused by the signal conversion.

An embodiment of the present invention can perform most of these signal conversions in one central place. It can also detect whether the TV signals received are analog or digital. All the manipulations of the digital data may be performed within the main processor 107 using software modules 115. However, if necessary, the main processor may comprise more than one physical chip. It may include another CPU or other periphery chips. A benefit of the present invention is that unnecessary conversions from digital to analog or analog to digital may be reduced or eliminated.

Looking at FIG. 11, if source 101 is an RF tuner that picks up a certain channel from the RF signal, those composite signals are digitized through a demodulator (not shown) at once, which can be a software module 115 or a peripheral device coupled to processor 107, and the converted digital signals are manipulated through the CPU without going through filters or other upscalers. Therefore, the final output signal is just nothing but a digital RGB signal which can be input to the digital display device 150, such as PDP, LCD, or DLP screen displays.

Moreover, set-top box functions like tuning and decoding of cable, satellite, or antenna signals can be performed within the system. A signal source may be directly connected to the system, which then performs the necessary functions to deliver the appropriate signals for processing so that they can be viewed or heard.

Centralized processing of audio/video signals provided by the present invention allows simplification of each device's hardware configuration by eliminating redundant processing and unnecessary signal conversions, thereby lowering manufacturing costs. Centralized processing can also provide digital processing of signals from the source to the last-end and provide high quality image and audio signals with superior control.

The present invention provides integrated and centralized processing of audio signals, video signals, and other information signals, enabling the elimination of unnecessary signal conversions when signals are sent to different components by functional decomposition of the conventional components.

Referring to FIG. 10, a typical DVD contains YUV data using MPEG 2 compression and has a 480i×60 field format. A conventional DVD player first decompresses the signal read by the laser pick-up device. The decompressed YUV data is then processed depending on the display to be used. Such a process may include, but is not limited to, conversions to composite signals for an analog TV or a VTR, de-interlacing for non-interlaced display device, resizing for the appropriate screen resolution, and color enhancing. Details of these processes are well known in the art and one of ordinary skill would know the kinds and methods of signal conversions necessary for displaying different video signals.

The present invention can perform all these processes in main processor 107. Therefore, the preferred embodiment of present invention may substantially reduce product costs by eliminating signal processing devices from each of the components (TV, VTR and DVD player). At the same time, the overall performance is improved by utilizing much more powerful processor for signal processing than the conventional parts used in the individual TV or DVD player. These advantages of the present invention are better realized by utilizing digitally coded video and audio sources with a display that can be digitally operated pixel by pixel.

More details about the operation of a DVD player according to the present invention are described below. A DVD contains video signals using an MPEG-2 decoding protocol and the format is 480i×60 fields per second. Thus, 240 odd line signals are displayed for 30 fields and 240 even line signals are displayed for the other 30 fields. The odd and even lines are alternately displayed to form a whole image.

High definition display devices, however, can provide much better resolution than the DVD's inherent resolution. There are certain methods that may increase or enhance DVD output signals. One way is to pick up the 480i signal from the source pickup device and de-interlace those signals. Then it doubles the scan lines and sends a signal of 480p×60 fields to the display device. That is what we usually call a progressive scan, which means that all 480 lines are displayed at the same time. HD-Q DVD does more than this. It resizes the 480 line signal into a 720 line signal, and then does a progressive scan. Such a resizing and progressive scan can be done in a video source player, such as DVD player or in the display itself.

However, the present invention enables such functions as de-interlacing and resizing (i.e., scaling) to be performed in main processor 107. All of these functions that are performed by different components may be implemented in main processor 107. This prevents redundant investment in different components and by saving those resources, we can extract better quality or much enhanced display performance with the same or even less resources.

In other words, after obtaining raw digital data signals from a video source, the present invention first processes and then outputs them to the digital display device, such as LCD, PDP or DLP™ projection TV. This is especially advantageous for video, which does not require a conversion to drive the output device, because the final output from the processor can be digital signals used directly by the digital display device. By doing so, we may eliminate analog-digital conversions once a digital signal is obtained. This dramatically reduces the possibility of signal distortion and noise in a very inexpensive manner. Not only that, as noted above in operation as an audio device or a TV, the present invention can reduce the production costs for the end components, such as the digital source pick-up device and the digital output device, by eliminating redundant conversion devices. The present invention can also provide a very flexible architecture because most of the signal compensation, resizing, or conversion can be performed using software. Therefore, if a new version or new protocol comes out, the device can be easily updated by simply upgrading the software.

Further, the present invention provides a flexible architecture that allows the system to efficiently adapt to the components attached to the processor box. Generally, once the video source signal is decoded and output to the video display, the video display may have to convert the signal depending on the native resolution of the display device.

For example, even though the video source outputs a high resolution signal of 1920×1080 format, if the display's native resolution does not meet such a high resolution, the video display will need to resize the high resolution signal down to 1280×720 or 865×480 format for it to be displayed according to the display's resolution. This requires additional unnecessary signal conversions, which may degrade signal quality and, thus, image quality.

The present invention may resolve these problems, taking advantage of its flexible architecture to use main processor 107 for converting the signal to a format that exactly matches the display's native resolution. Main processor 107 can output 1920×1080 high resolution signal if the attached display can support such a high resolution. If the attached display only support up to 865×480 resolution, then main processor 107 can easily convert the video signals to that format and send them to the display. Accordingly, the present invention can provide signals that may exactly fit any given display device because all the output signals are processed by a main processor using software, rather than through physically separated and dedicated conversion chips or circuits.

Other types of conversions can be made by the processor to account for abnormalities in the display. For instance, a display device may need higher-end optical elements, like lenses, light sources, mirrors, front glass plates, and sensors, for example, to provide to provide a true high-definition display. Otherwise, abnormalities in these elements can degrade the quality of the image output. U.S. Patent Application Publication 2004/076336 describes a method for "warping" the image so that a corrective effect to overcome these abnormalities in either an image capture or image display device can be achieved. A processor is used in either the capture device or display device itself In another embodiment of the present invention, however, main processor 107 can be used to make these corrective adjustments to the video signals. The main processor can perform such adjustments through software or with the assistance of a special peripheral circuitry, like the Silicon Optix sxW1-LX chip. Thereby, the need for placing additional processing circuitry in the display may be eliminated, which allows the production of a high quality display at a lower price.

DLP™ rear projectors also pose a special problem for digital displays because, unlike PDP and LCD displays, they are not flat and can take up a lot of room for larger display sizes. In a rear projection DLP™ display, an image projector projects an image onto a mirror at the back of the display case, which reflects the image onto the screen for viewing. For larger screen sizes, there must be a sufficient projection distance between the screen and mirror for the reflected image to be displayed properly. Thus, DLP™ rear projection displays were relatively bulky as compared to other digital display types. To reduce the depth of these displays, a curved mirror was implemented to reduce the projection distance needed for achieving a larger display. Another typical way of reducing the projection distance is to reflect the image off of more than one mirror, which may also be disposed at a wide angle as compared to the viewing angle. However, the images displayed by these alternatively configured rear projection DLP™ rear projection displays often are distorted.

U.S. Patent Application Publication 2003/0231261 addresses these problems by "pre-distorting" the image in a manner that uses the distortion caused by the DLP™ display's configuration to display an image correctly. The present invention obviates the need to provide such pre-distortion in the display itself. Rather, this distortion may be performed by main processor 107 so that an embodiment of the present invention may use an integrated audio/video processing system with a dummy DLP™ rear projection display having a reduced projection distance requirement.

Such a pre-adjustment of images that can be achieved by the present invention is not limited to a rear-projection display. For a regular projector display, the present invention can make pre-adjustments for the correct display of images based on the properties and characteristics of lenses and other optical equipment. Therefore, high-end components and lenses, which greatly increase a display's cost, may not be required to achieve a high quality image display.

In summary, the present invention finally integrates audio, video, Internet, and media storage in one functional device, taking advantage of developments in digital audio/video sources and digital display devices. Thus far, we have described the system and method of the present invention that takes advantage of digital audio/video source and recently developed digital video displays to provide a higher quality audio and video experience. The aspects of the present invention with respect to the Internet and storage functions will now be described.

In another embodiment of the present invention, a storage device may be included with the integrated audio/video processing system that can facilitate dynamic customization of the system depending on the audio or video source. By decomposing the functions of the conventional components of the audio/video system and implementing those functions in one processor, it also makes it possible to control the rather complex audio/video system using one simple control interface. Thus, another aspect of the present invention is directed to an audio/video integrated control system with source codes stored in a mass storage device.

Figure 12:
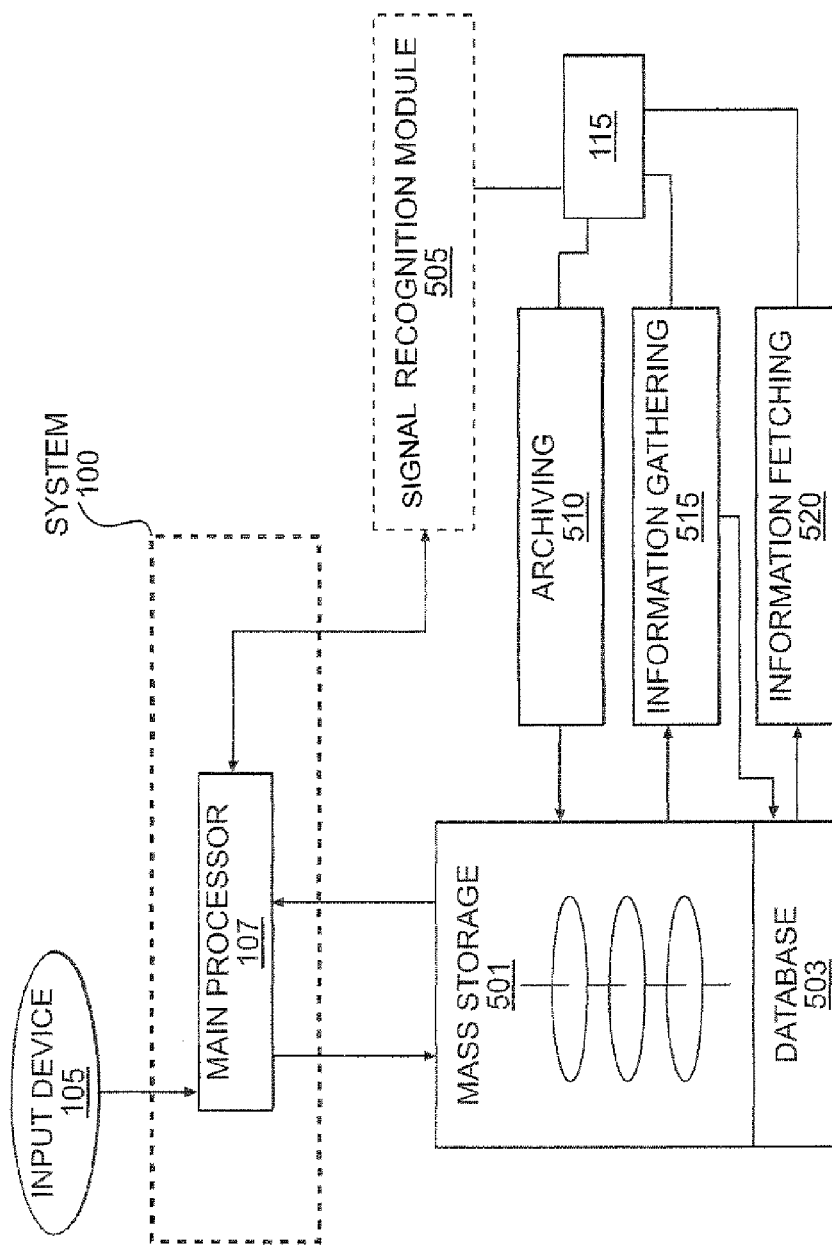
FIG. 12 shows a schematic block diagram for an automatic preference control system according to an embodiment of the present invention.

FIG. 12 shows a mass storage device 501 in communication with main processor 107 of system 100. Mass storage device can be coupled externally or internally to integrated audio/video system 100 and include a database 503 for storing media characteristics. Optionally, a signal recognition module 505, which can be a software module coupled to processor 107, may be included. Other software modules 115 may include: an archiving system 510 that archives content in storage device 501; an information gathering system 515 for analyzing stored off-line content in conjunction with the archiving system 510 or real time content in conjunction with signal recognition module 505 for use in database 503; and information fetching system 520 for retrieving analyzed content characteristics from database 503.

Signal recognition module 505 can recognize certain types of signals that may be specific to the type of audio presented or the type of image displayed. For example, certain audio signal characteristics may be associated with an optimal presentation of jazz music, or certain video signals may be associated with an optimal display of kinetic scenes in action movies. The advantages of providing a signal recognition module, or other similar feedback and control mechanism, are described in detail below.

Typically, a home entertainment system outputs audio and video signals on a real time basis as users normally do not operate the system unless, for example, they wish to hear music or watch a movie at that time. For real time play, users have to load the sources, CDs or DVDs, on the player whenever they want to enjoy them. Jukeboxes are available to physically aggregate many music sources (CDs or LPs) and DVDs in one place for a user to select desired media.

However, another method for aggregating audio and video media is to store them in a mass storage device like a hard disk, a flash memory, or any other possible mass storage device. Here, mass storage device 501 can be a storage device contained in a box, like a hard disk in a PC, an external device, or the Internet. It is not limited thereto and any future development of mass storage device as well as their equivalents can be used. Mass storage device 501 can be connected through any suitable communication method, such as the Internet, USB, or Firewire, for example.

Other home entertainment system components provide storage of audio and video media, such as Tivo® for video or the Bose Lifestyle® system for audio. However, they do not provide the audiovisual enhancement achieved by the present invention through functional decomposition of the components.

More importantly, according to one embodiment of the present invention, ample supplemental information regarding the media stored in mass storage device 501 can be collected through an off-line analysis of such media. An example of how such supplemental information can be used will now be described.

For example, storage device 501 may contain a string concerto media file. Processor 107, using information gathering software, for example, can perform off-line analysis of the string concerto stored in the hard disk. In other words, the computer can analyze the audio source, when the music is not played, and can tag the string music as a high frequency audio source, the vocals as a mid frequency audio source, and the percussion as a low frequency audio source. This analysis can be performed by main processor 107 or other information gathering system 515 in conjunction with archiving system 510 while the music is not played. Once the musical characteristics are identified, they can be stored on database 503 and retrieved by information fetching system 520 to adjust the output signals in order to accommodate such characteristics. For example, to emphasize a violin's high frequency sound, the processor may automatically adjust the crossover for the high frequency range from 2 KHz to 1.7 KHz based on the off-line analysis. This may produce much better sound by increasing the tweeter range for a violin. Typical home entertainment systems using mass storage devices cannot provide such automatic control features. Generally, if a listener wants to change the crossover frequency from 2 KHz to 1.5 KHz, he has to manually adjust an expensive digital crossover network in order to make such changes. Such manipulations require human intervention and rely on the judgment of the listener.

However, in an embodiment of the present invention, the computer can analyze the music by analyzing the sound waves or the combination of the digital codes. The system can determine that a string concerto generates a lot of high frequency sound and can adjust the crossover network that might be optimal to the particular listening environment.

Moreover, system 100 can analyze the listening room environment. An input device 105, which may be a microphone, is provided that may monitor the sound that the system produces, and depending on the listening room's sound reflection or absorption, the input device may give feedback to the system. Based on this feedback, the processor can make changes to compensate for the listening environment's characteristics. For example, in certain room structures, the bass frequency may be disproportionately absorbed. In such a case, the processor can increase the bass output in order to compensate for the absorbed bass sound. On the other hand, if the high frequency sound generates too much reflection, then the processor may reduce the high frequency output in order to achieve an optimal listening experience.

The audio characteristics can also be dynamically adjusted based on other factors of the listening environment. For example, adjustments can be made based on the positions of the speakers to one another. Therefore, if input device 105 detects that a left front speaker is further away than the front right speaker, an adjustment can be made to balance the sound by increasing the left front speaker volume. Adjustments can also be made based on the position of the listener in the room. Thus, for example, if a listener is in the back of the room, the rear speaker volume may be lowered, while the front speaker volume is increased. Adjustments can be made further for the size of the listening audience. In these cases, the input device may be a camera.

The same adjustment feature may be used to adjust a video output. TV programs can be recorded on mass storage device 501 just like the Tivo® or any other DVR. By reviewing the stored program before the viewer watches it, the processor can detect the commercials portion and then can skip or delete them accordingly. On the other hand, based upon that commercial information, a user can contact the vendors to purchase such products that show up in the commercials. Therefore, the present invention may take advantage of the mass storage by generating additional source information by processing them off-line.

Furthermore, video clips can be analyzed off-line and be easily used for later purposes. For example, a user can have the stored video media analyzed to find a scene showing a banana. Another user can have the media analyzed to find a scene with more than 10 people. By analyzing the video sources, people can gather certain types of images such as, for example, landscapes, sunrises, sunsets, skyscrapers, human faces, snow falls, and ocean views. Once the system analyzes the stored video media and tags the scenes while the system is not being used (i.e. off line), the tagged scenes can be found very easily. This might be really useful in video editing, organizing digital photo albums, and for other image related applications.

Also, based on the information generated by the off-line processing of the video media, the video output signals may be adjusted to provide an optimal viewing experience in a similar manner as the audio is adjusted to provide an optimal listening experience. For example, if the video signals are going to output a long sequence of blue ocean scenery, the preferred embodiment of the present invention may adjust a certain aspect of the video signal to be optimal for the attached video display, or based on the viewing environment, such as ambient light. The system may also adjust image characteristics like color intensity and luminescence based on the distance the viewer is from the display. The system may "learn" the optimal characteristics for different types of images and store that data in mass storage device 501.

In other words, the combination of a mass storage with a powerful centralized integrated audio/video processor can provide off-line processing of the stored audio and video media that generates supplemental information which may later be used to enhance the users' overall listening and viewing experience. In addition, because of the central control provided, audio or video connoisseurs may choose to manipulate the audio and video signals manually and database 503 on mass storage device 501 can be used to store their preferred settings for specific types of media and different user profiles can also be stored to further personalize the system.

As a result, users can store media content on mass storage device 501 and information gathering system 515 analyzes the mass storage device's contents and constructs a database of the contents' characteristics. Information fetching system 520 uses the collected characteristic information of the contents, i.e., the supplemental information, and adjusts the parameters of the system. For example, information fetching system 520 may adjust the volume, filter, and crossover control for audio signals and may control scaling and color enhancing for video signals. With this embodiment, user may be freed from annoyance of controlling the listening or viewing conditions whenever the media content being played changes.

Figure 13:
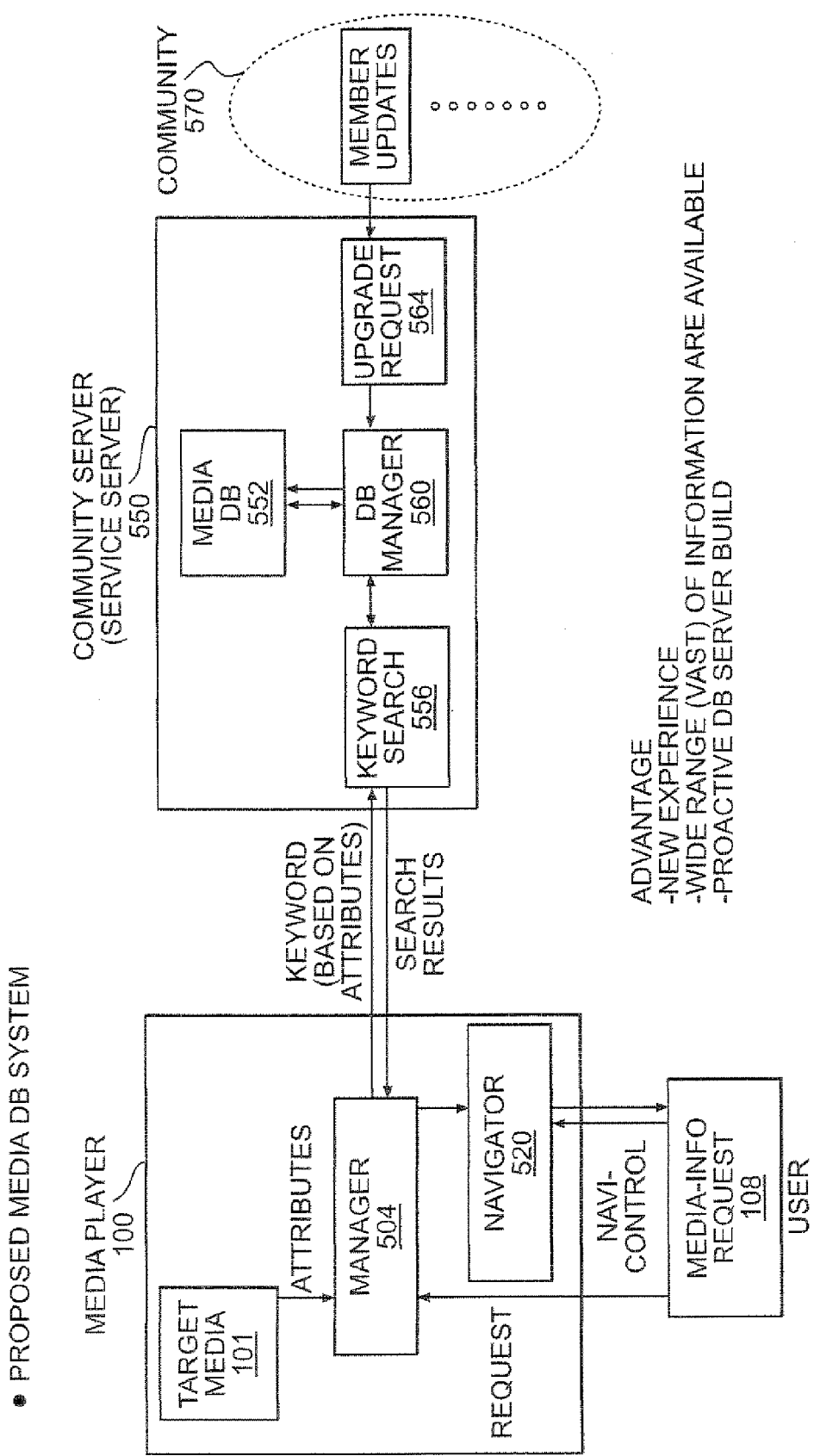
FIG. 13 shows a schematic block diagram for a media-database file sharing system according to an embodiment of the present invention.

Referring to FIG. 13, this supplemental information, as well as personalized settings or profiles, can be shared over the Internet. This may save users from trying the trial and error method for determining the best audiovisual settings because these settings can be shared among users of the system. Such information can be generated and put in a central database to be sold or this information could be just shared among the users in a cyber community database.

Because the invention contemplates the use of a PC architecture, the system has the flexibility of using any suitable device for providing connectivity to the Internet such as, for example, an ethernet connection, wireless 802.11a/b/g connection, a digital subscriber line modem, a cable modem, or a regular telephone modem. The software modules may also be delivered over this connection. Moreover, personalized media like movies, TV programs, or music can also be delivered to the system over the connection. Such media may be delivered at the request of the user or could be offered automatically based on the user preferences determined by main processor 107 in evaluating the content stored on mass storage device 501 or media that has otherwise been viewed or listened to.

In the media-database sharing system of FIG. 13, the media system 100 may also include target source 101a manager 504, which may be included on database 503, and a navigator 521, which may also be incorporated into information fetching system 520. Manager 504 is in communication with a community server 550 that includes: a media database 552, a keyword search module 556, a database manager 560. Community server may also include an update request module for accessing media information stored on the databases of other users in community 570 or media information from a central provider. Manager 504 obtains media characteristics from target media source 101 based on user input 108. Navigator 521 can retrieve such information from the manager to make adjustments to an output signal based on user input 108.

In addition, manager 504 can query community server 550 for media information. Keyword search module 556 processes the request from manager 504. The request from manager 504 may be as a result of direct user input 108 or an automated request to provide the ideal characteristics for a given type of media. Database manager 560 searches media database 552 for information on the target media. Using update request module 564, database manager may also query the community 570, which can be other connected users or a centralized provider, for information on target media source 101. Database manager 560 will update media database 552 based on information received in response to a community query. Search results will be sent back to manager 504 and may be used to adjust audio output in the manner described above. Community server 550 can query manager 504 for media information in database 503 to provide such information other users in community 570 as well.

Users of this embodiment of the present invention may upload their supplemental information to a server or may download other supplemental information generated by others from the server. Users also may exchange their information among themselves without using a server like in a peer-to-peer network, for example. Users may now find information more easily and conveniently that may be necessary for either proper operation of their system or for creating the exact environment to meet their tastes.

Moreover, other Internet functionality can also be provided such as voice over internet protocol (VoIP) telephone service, teleconferencing, e-mail, file sharing, Internet browsing, and Internet messaging, for example. Moreover, the flexible PC architecture permits the system to function as a PC, and could operate computer programs like productivity applications like word processing, spreadsheets, and presentation software, just to name a few.

The PC architecture plus improved audiovisual capability makes the system of the present invention suitable as a game console as well. Software emulation may be used to mimic other game systems or a proprietary system could be developed. Moreover, if an Internet connection is present, a system may permit network gaming that has become extremely popular, such as the X-Box® Live or EA Sports™ Online. This service could be provided in a similar manner as the cyber community for sharing system control settings information described above. The Internet also could be used to deliver game content to the system in a similar manner as audio and video media.

While the present invention has been described in detail above with reference to specific embodiments, those skilled in the art will appreciate that various modifications and substitutions can be made thereto without departing from the spirit and scope of the present invention.

What is claimed is:

1. A speaker system, comprising:
    a digital crossover unit implemented as a software module and configured to separate an input audio signal into different frequency ranges;
    a hybrid amplifier configured to respectively receive the different frequency ranges output by the digital crossover unit and to generate a plurality of speaker driving currents corresponding to the different frequency ranges;
    a first interchangeable speaker module comprising a woofer speaker unit configured to receive a low frequency driving current; and
    a second interchangeable speaker module comprising a tweeter speaker unit configured to receive a high frequency driving current;
    wherein:
    the digital crossover unit and the amplifiers are not contained in any of the speaker units;
    each speaker unit comprises a dummy speaker comprising a driving unit and no crossover logic;
    the hybrid amplifier comprises:
        at least one digital amplifier providing the low frequency speaker driving current to the woofer speaker unit; and
        at least one analog amplifier providing the high frequency speaker driving current to the tweeter speaker unit; and
    the digital crossover unit is configured to dynamically adjust the different frequency ranges while an audio source is playing.

2. The speaker system of claim 1, further comprising a speaker housing, wherein the first and second interchangeable speaker modules are removably couplable to the speaker housing.

3. The speaker system of claim 1, wherein each of the first and second interchangeable speaker modules are removably couplable to one another.

* * * * *